(12) United States Patent
Sireli et al.

(10) Patent No.: US 9,000,604 B2
(45) Date of Patent: Apr. 7, 2015

(54) UNIDIRECTIONAL HYDRO TURBINE WITH ENHANCED DUCT, BLADES AND GENERATOR

(75) Inventors: Eyup Mete Sireli, Vancouver (CA); Mihai C. Platon, Vancouver (CA); Milen Atanasov Raychev, Vancouver (CA)

(73) Assignee: Clean Current Limited Partnership, Vancouver (CA)

( * ) Notice: Subject to any disclaimer, the term of this patent is extended or adjusted under 35 U.S.C. 154(b) by 226 days.

(21) Appl. No.: 13/695,335

(22) PCT Filed: Apr. 29, 2011

(86) PCT No.: PCT/CA2011/050264
§ 371 (c)(1),
(2), (4) Date: Oct. 30, 2012

(87) PCT Pub. No.: WO2011/134090
PCT Pub. Date: Nov. 3, 2011

(65) Prior Publication Data
US 2013/0043685 A1    Feb. 21, 2013

Related U.S. Application Data
(60) Provisional application No. 61/330,268, filed on Apr. 30, 2010.

(51) Int. Cl.
| | | |
|---|---|---|
| F03B 13/00 | (2006.01) | |
| F03B 17/06 | (2006.01) | |
| F03B 11/02 | (2006.01) | |

(52) U.S. Cl.
CPC ............... *F03B 17/061* (2013.01); *F03B 11/02* (2013.01); *F05B 2240/97* (2013.01); *Y02E 10/28* (2013.01)

(58) Field of Classification Search
USPC ........................................ 290/43, 54
See application file for complete search history.

(56) References Cited

U.S. PATENT DOCUMENTS
| | | |
|---|---|---|
| 654,654 A | 7/1900 | Lawrence |
| 1,123,491 A | 1/1915 | Corbin |

(Continued)

FOREIGN PATENT DOCUMENTS
| | | |
|---|---|---|
| AU | 2002328217 | 9/2005 |
| AU | 2005284617 | 1/2011 |

(Continued)

OTHER PUBLICATIONS
WIPO, International Search Report for PCT/CA2007I000181, May 1, 2007, 4 pages.

(Continued)

*Primary Examiner* — Tho D Ta
(74) *Attorney, Agent, or Firm* — Palmer IP; Graeme A. Herring

(57) ABSTRACT

An apparatus is disclosed for a turbine for generating electrical power from fluid flow comprising a duct with an oblong elevation, intake hoods and vents, aft diffuser cutouts and an oblique face to optimize flow and therefore power characteristics. A unidirectional turbine generator apparatus is also disclosed comprising turbine blades with one or more raked and/or tapered sections, and optionally also with multiple beaded surface features to improve efficiency and performance of the turbine generator. A hydro turbine generator with a single-sided axial-flux magnetic generator is disclosed comprising a hybrid magnetic/anti-friction axial bearing assembly. A multiple turbine generator arrangement is also disclosed comprising multiple unidirectional turbine generators connected to a shore-based electrical distribution system.

22 Claims, 34 Drawing Sheets

(56) References Cited

U.S. PATENT DOCUMENTS

| | | |
|---|---|---|
| 1,326,730 A | 12/1919 | Helguera |
| 1,476,229 A | 5/1922 | Seuss |
| 1,486,186 A | 3/1924 | Gulbransen |
| 1,493,154 A | 5/1924 | Harza |
| 1,562,556 A | 11/1925 | Harza |
| 1,835,018 A | 12/1931 | Darrieus |
| 2,471,892 A | 5/1949 | Price |
| 2,501,696 A | 3/1950 | Souczek |
| 2,509,442 A | 5/1950 | Matheisel |
| 2,652,505 A | 2/1957 | Matheisel |
| 2,782,321 A | 2/1957 | Fischer |
| 3,230,702 A | 1/1966 | Soulez |
| 3,323,592 A | 6/1967 | Brandon |
| 3,353,028 A | 11/1967 | Braikevitch et al. |
| 3,447,741 A | 6/1969 | Havette |
| 3,504,990 A | 4/1970 | Sugden |
| 3,740,565 A | 6/1973 | Wesley |
| 3,922,574 A | 11/1975 | Whiteley |
| 3,980,894 A | 9/1976 | Vary et al. |
| 3,986,787 A | 10/1976 | Mouton et al. |
| 4,025,220 A | 5/1977 | Thompson |
| 4,075,500 A | 2/1978 | Oman |
| 4,095,918 A | 6/1978 | Mouton |
| 4,123,666 A | 10/1978 | Miller |
| 4,132,499 A | 1/1979 | Igra |
| 4,140,433 A | 2/1979 | Eckel |
| 4,159,188 A | 6/1979 | Atencio |
| 4,159,427 A | 6/1979 | Wiedemann |
| 4,163,904 A | 8/1979 | Skendrovic |
| 4,166,596 A | 9/1979 | Mouton |
| 4,219,303 A | 8/1980 | Mouton |
| 4,221,538 A | 9/1980 | Wells |
| 4,258,271 A * | 3/1981 | Chappell et al. ............... 290/54 |
| 4,313,711 A | 2/1982 | Lee |
| 4,320,304 A | 3/1982 | Karlsson et al. |
| 4,324,985 A | 4/1982 | Oman |
| 4,367,413 A | 1/1983 | Nair |
| 4,368,392 A | 1/1983 | Drees |
| 4,385,492 A | 5/1983 | Lee |
| 4,417,446 A | 11/1983 | Nakamoto et al. |
| 4,421,990 A | 12/1983 | Heuss et al. |
| 4,422,820 A | 12/1983 | Kirsch |
| 4,464,580 A | 8/1984 | Miller et al. |
| 4,468,153 A | 8/1984 | Gutierrez Atencio |
| 4,476,396 A | 10/1984 | Calvert, Jr. |
| 4,524,285 A | 6/1985 | Rauch |
| 4,593,527 A | 6/1986 | Nakamoto et al. |
| 4,648,788 A | 3/1987 | Jochum |
| 4,720,640 A | 1/1988 | Anderson et al. |
| 4,740,711 A | 4/1988 | Sato et al. |
| 4,755,690 A | 7/1988 | Obermeyer |
| 4,781,522 A | 11/1988 | Wolfram |
| 4,804,855 A | 2/1989 | Obermeyer |
| 4,868,408 A | 9/1989 | Hesh |
| 5,228,800 A | 7/1993 | Akai |
| 5,440,176 A | 8/1995 | Haining |
| 5,464,320 A | 11/1995 | Finney |
| 5,477,091 A | 12/1995 | Fiorina et al. |
| 5,506,453 A | 4/1996 | McCombs |
| 5,541,460 A | 7/1996 | Dunfield et al. |
| 5,592,816 A | 1/1997 | Williams |
| 5,592,819 A | 1/1997 | Ansart et al. |
| 5,825,094 A | 10/1998 | Hess |
| 5,880,550 A | 3/1999 | Fukao et al. |
| 5,982,070 A | 11/1999 | Caamano |
| 6,049,188 A | 4/2000 | Smith |
| 6,109,863 A | 8/2000 | Milliken |
| 6,139,255 A | 10/2000 | Vauthier |
| 6,146,096 A | 11/2000 | Winkler |
| 6,168,373 B1 | 1/2001 | Vauthier |
| 6,234,772 B1 | 5/2001 | Wampler et al. |
| 6,250,880 B1 | 6/2001 | Woodard et al. |
| 6,281,597 B1 | 8/2001 | Obermeyer |
| 6,285,090 B1 | 9/2001 | Brutsaert et al. |
| 6,382,904 B1 | 5/2002 | Orlov et al. |
| 6,406,251 B1 | 6/2002 | Vauthier |
| 6,476,513 B1 | 11/2002 | Gueorguiev |
| 6,648,589 B2 | 11/2003 | Williams |
| RE38,336 E | 12/2003 | Williams |
| 6,727,600 B1 | 4/2004 | Abdurachmanov |
| 6,806,586 B2 * | 10/2004 | Wobben ............... 290/54 |
| 6,836,028 B2 | 12/2004 | Northrup et al. |
| 6,955,049 B2 | 10/2005 | Krouse |
| 6,957,947 B2 | 10/2005 | Williams |
| 6,982,498 B2 | 1/2006 | Tharp |
| 7,018,166 B2 | 3/2006 | Gaskell |
| 7,042,109 B2 | 5/2006 | Gabrys |
| 7,127,886 B2 | 10/2006 | Fielder |
| 7,147,428 B2 * | 12/2006 | Lamont ............... 290/54 |
| 7,154,193 B2 | 12/2006 | Jansen et al. |
| 7,190,087 B2 | 3/2007 | Williams |
| 7,339,284 B2 | 3/2008 | Manchester |
| 7,357,622 B2 | 4/2008 | Corten et al. |
| 7,372,172 B2 * | 5/2008 | Winkler et al. ............... 290/43 |
| 7,378,750 B2 | 5/2008 | Williams |
| 7,385,303 B2 | 6/2008 | Roos |
| 7,416,525 B2 | 8/2008 | Wampler et al. |
| 7,444,811 B2 | 11/2008 | Skotte et al. |
| 7,471,009 B2 | 12/2008 | Davis et al. |
| 7,517,263 B1 | 4/2009 | Shen et al. |
| 7,600,963 B2 | 10/2009 | Miller |
| 7,637,722 B1 | 12/2009 | Koepsel et al. |
| 7,874,788 B2 | 1/2011 | Stothers et al. |
| 8,536,723 B2 * | 9/2013 | Roos ............... 290/52 |
| 2002/0088222 A1 | 7/2002 | Vauthier |
| 2003/0228225 A1 | 12/2003 | Saito et al. |
| 2005/0179264 A1 | 8/2005 | Ganev |
| 2005/0285407 A1 | 12/2005 | Davis et al. |
| 2007/0284884 A1 * | 12/2007 | Stothers et al. ............... 290/54 |
| 2008/0080983 A1 | 4/2008 | Wampler et al. |
| 2008/0089797 A1 | 4/2008 | Wampler et al. |
| 2008/0143205 A1 | 6/2008 | Pulnikov et al. |
| 2008/0252162 A1 | 10/2008 | Post |
| 2009/0243300 A1 | 10/2009 | Davis et al. |
| 2009/0322095 A1 | 12/2009 | Mazur |
| 2010/0007148 A1 | 1/2010 | Davis et al. |
| 2010/0007225 A1 | 1/2010 | Platon et al. |
| 2011/0115228 A1 | 5/2011 | Stothers et al. |
| 2011/0248505 A1 | 10/2011 | Sringer et al. |

FOREIGN PATENT DOCUMENTS

| | | |
|---|---|---|
| CA | 2460479 | 3/2003 |
| CA | 2008014564 | 3/2003 |
| CA | 2481820 | 3/2006 |
| CA | 2549376 | 3/2006 |
| CA | 2659824 | 2/2008 |
| CA | 2481820 | 3/2011 |
| CA | 2640643 | 5/2011 |
| CH | 684430 | 9/1994 |
| CN | 85201823 | 3/1986 |
| CN | 101023264 A | 8/2007 |
| CN | ZL02822481.7 | 5/2010 |
| DE | 1028948 | 4/1958 |
| DE | 102008037896 A1 | 2/2010 |
| EP | 0045202 A1 | 2/1982 |
| EP | 1338793 | 8/2003 |
| EP | 1430220 | 6/2005 |
| EP | 1466090 | 3/2007 |
| EP | 2112370 | 10/2009 |
| EP | 1338793 | 9/2010 |
| EP | 2317122 | 5/2011 |
| FR | 026223 | 9/1923 |
| FR | 866053 | 6/1941 |
| FR | 891697 | 3/1944 |
| FR | 56102 | 9/1952 |
| FR | 2527803 | 12/1983 |
| FR | 2660701 | 10/1991 |
| GB | 2348250 | 9/2000 |
| IN | 234698 | 6/2009 |
| JP | S50-094339 | 7/1975 |
| JP | S55-5402 | 1/1980 |
| JP | 55072665 | 5/1980 |
| JP | 56077565 | 6/1981 |

(56) References Cited

FOREIGN PATENT DOCUMENTS

| | | |
|---|---|---|
| JP | 56-149555 | 11/1981 |
| JP | 56-149888 U | 11/1981 |
| JP | S61-192859 | 8/1986 |
| JP | S62-38876 | 2/1987 |
| JP | S62-71381 | 5/1987 |
| JP | H03-222869 | 10/1991 |
| JP | 58048781 | 9/1992 |
| JP | H06-87671 | 12/1994 |
| JP | H08-338354 | 12/1996 |
| JP | H10-115278 | 5/1998 |
| JP | 2000-213446 | 8/2000 |
| JP | 2000-240552 | 9/2000 |
| JP | 2005-502821 | 1/2005 |
| JP | 4024208 | 10/2007 |
| KR | 1033544 | 4/2011 |
| KR | 10-2004-0055779 | 5/2011 |
| NL | 9400050 | 8/1995 |
| NL | 1012489 | 11/2000 |
| NO | 328222 | 1/2010 |
| NZ | 553511 | 2/2005 |
| PH | 1-2004-500369 | 9/2007 |
| PH | 1-2007-500341 | 9/2011 |
| PH | 1-2007-500768 | 4/2013 |
| WO | 0028210 | 5/2000 |
| WO | 0050769 | 8/2000 |
| WO | WO 0050769 | 8/2000 |
| WO | 0055440 | 9/2000 |
| WO | WO 0055440 | 9/2000 |
| WO | 0106122 | 1/2001 |
| WO | 0125627 | 4/2001 |
| WO | 02061918 | 8/2002 |
| WO | WO 03-025385 | 3/2003 |
| WO | WO03025385 A2 | 3/2003 |
| WO | 2006022554 | 3/2006 |
| WO | 2006029496 A1 | 3/2006 |
| WO | 2008006614 | 1/2008 |
| WO | 2008014564 | 2/2008 |
| WO | 2008014584 | 2/2008 |
| WO | WO 2008/014584 | 2/2008 |
| WO | 2009079787 | 7/2009 |
| WO | 2009130020 | 10/2009 |
| WO | 2010012071 A1 | 2/2010 |
| WO | 2010017869 | 2/2010 |
| WO | 2012004076 | 1/2012 |

OTHER PUBLICATIONS

Curran and Gato. "The Energy Conversion Performance of Several Types of Wells Turbine Designs". Proc. Inst. Mech. Engrs. vol. 211 Part A, (1997).

Davis. Barry V., Nova Energy Ltd., "A Major Source of Energy From the World's Oceans", IECEC-97 Conference. Jul. 31, 1997. Honolulu.

Davis, Barry V., Nova Energy Ltd., Water Turbine Model Trials*. Report No. NEL 002. 1980.

Phillips, D. G., et al., Diffuser Development for a Diffuser Augmented Wind Turbine Using Computational Fluid Dynamics, 2000, 00. 1-10, University of Auckland, New Zealand.

Dixon, S. L., Fluid Dynamics, Thermodynamics of Turbomachinery, 4th ed., 1996, University of Liverpool, pp. 124-133.

Vortec Energy, Information Memorandum, Nov. 20, 2001, pp. 1-15, Vortec Energy, New Zealand.

Kirke, Brian, Developments in Ducted Water Current Turbines, Tidal Paper, Aug. 16, 2003. pp. 1-12, School of Engineering, Griffith University, Australia.

PCT International Search Report for PCT/CA2005/000267, May 17, 2005, 4 pages.

Davis, Barry V., Nova Energy Ltd., Hydraulic Turbine Trials*. Report No. NEL 002. 1980.

Grauers, Anders, "Design of Direct-driven Permanent-magnet Generators for Wind Turbines", School of Electrical and Computer Engineering, Chalmers University of Technology, Göteborg, Sweden. Technical Report No. 292, Oct. 1996.

N. Gautam, A. Rentschler, T. Schneider, A. Binder, "Modeling and analysis of parallel connected permanent magnet synchronous generators in a small hydropower plant", Proceedings of the 2006 IASME/WSEAS International Conference on Energy & Environmental Systems, Chalkida, Greece, May 8-10, 2006.

Tuomo Lindh, Pia Salminen, Juha Pyrhönen, Markku Niemelä, Janne Kinnunen, Jorma Haataja, "Permanent Magnet Generator Designing Guidelines", POWERENG 2007, Setúbal, Portugal, Apr. 12-14, 2007.

C.J. Lawn, "Optimization of the Power Output from Ducted Turbines", Proceedings of the Institution of Mechanical Engineers, Part A: Journal of Power and Energy,, 2003 217: 107.

* cited by examiner

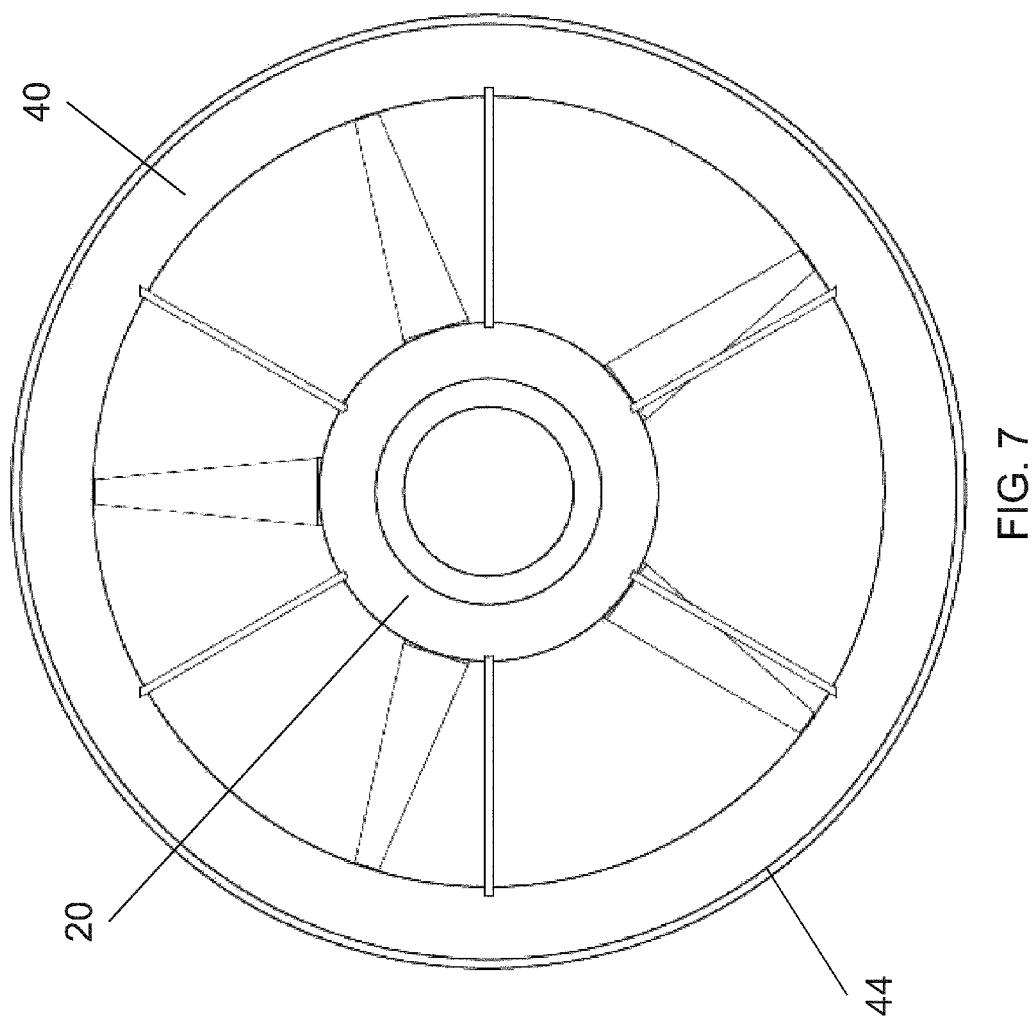

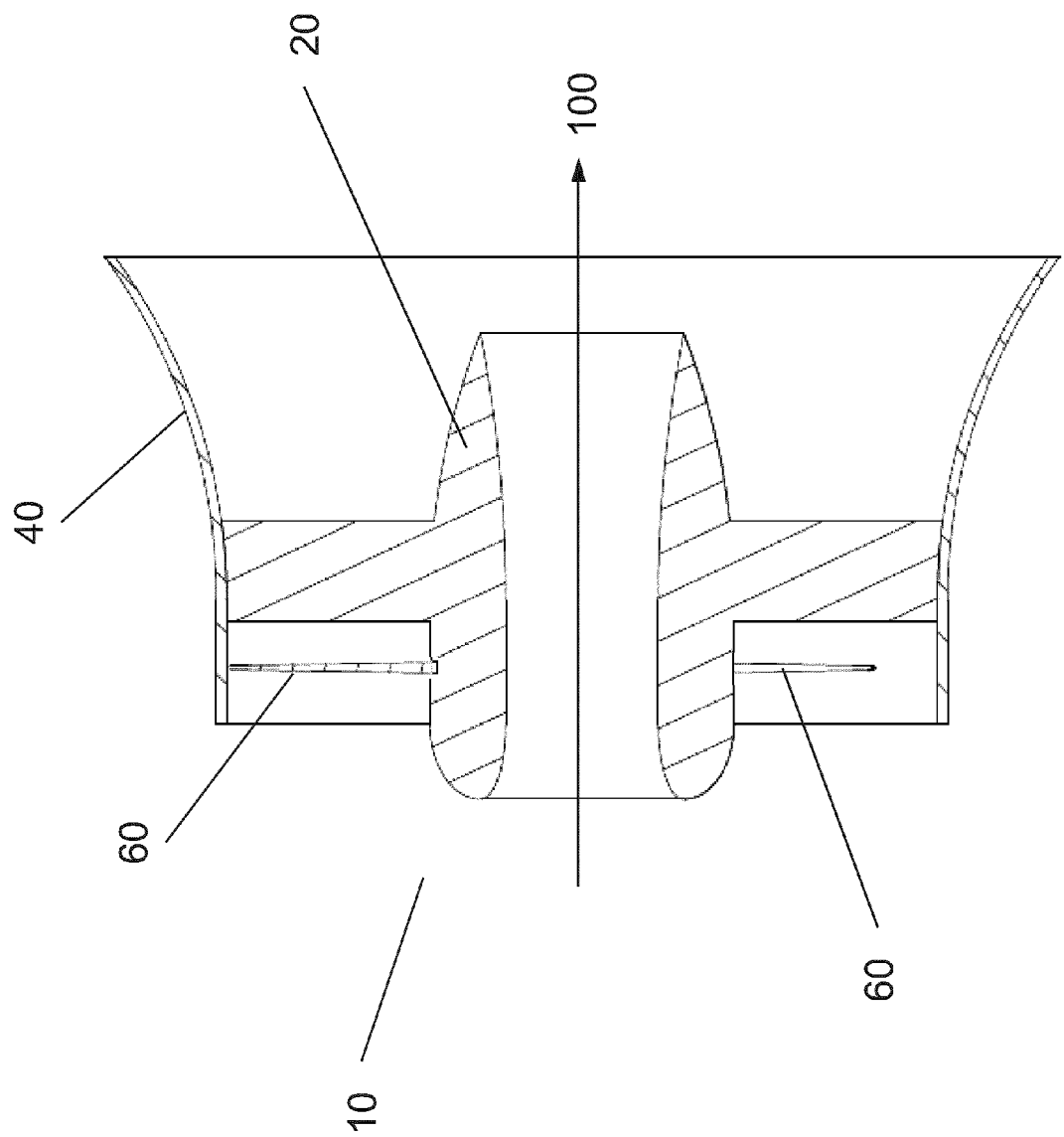

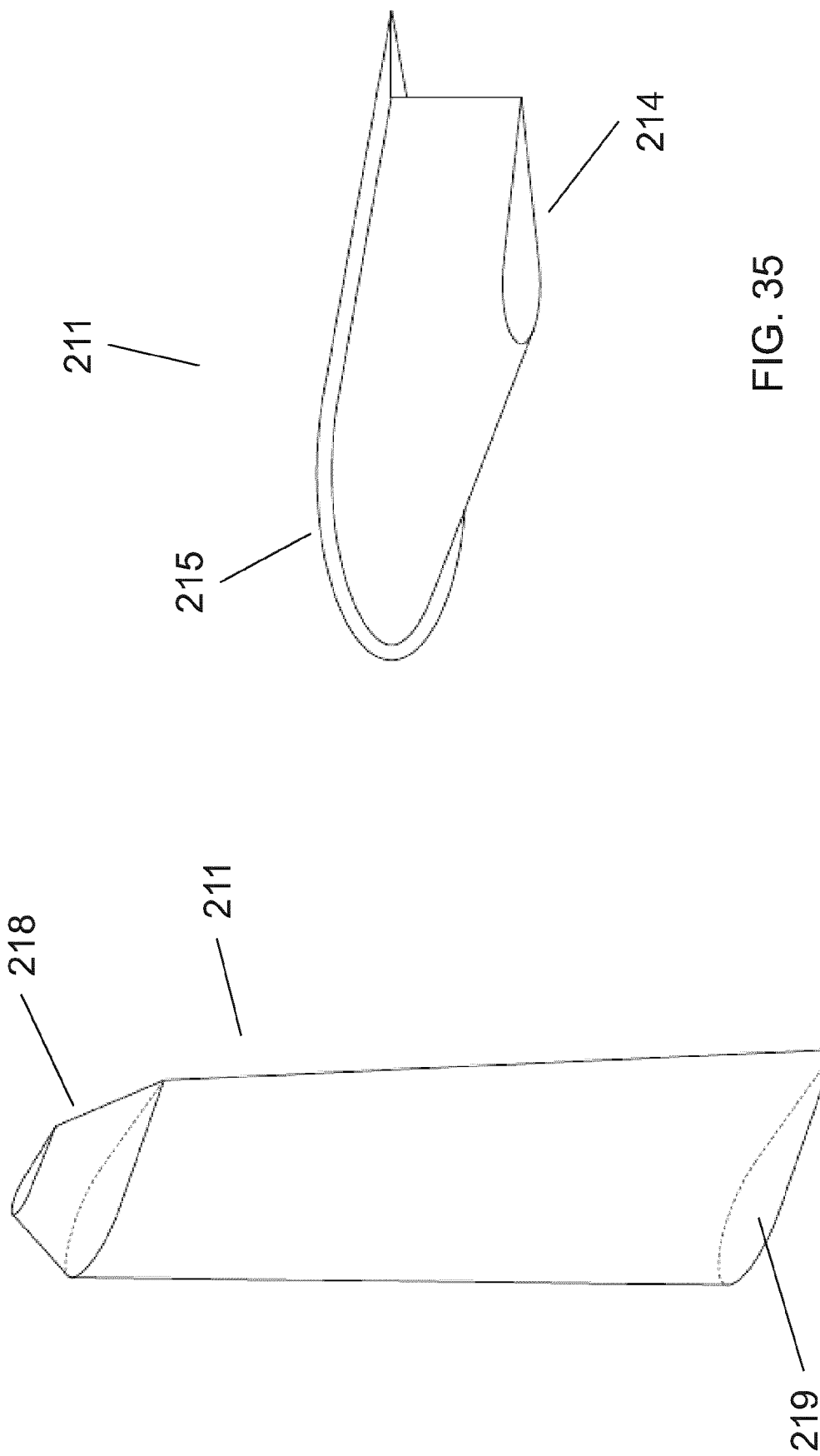

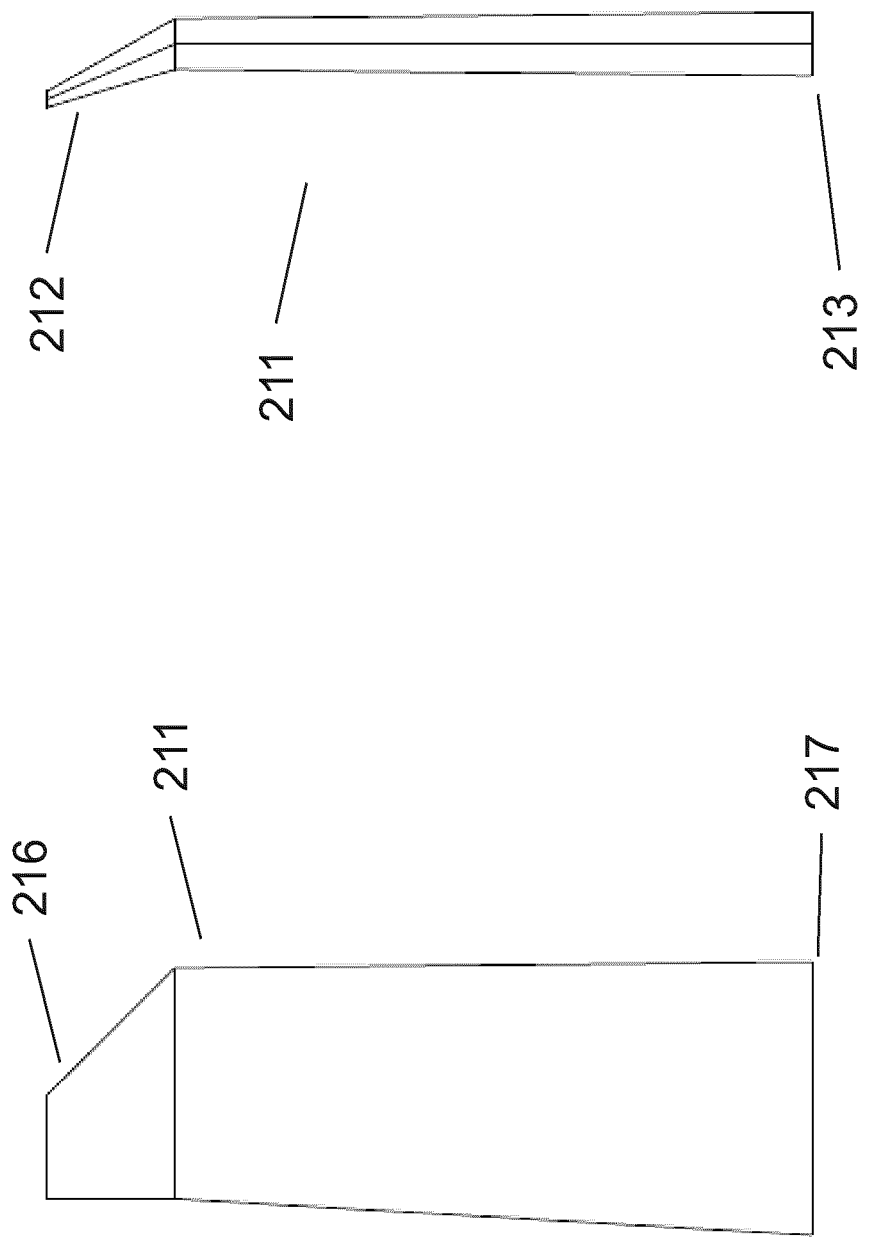

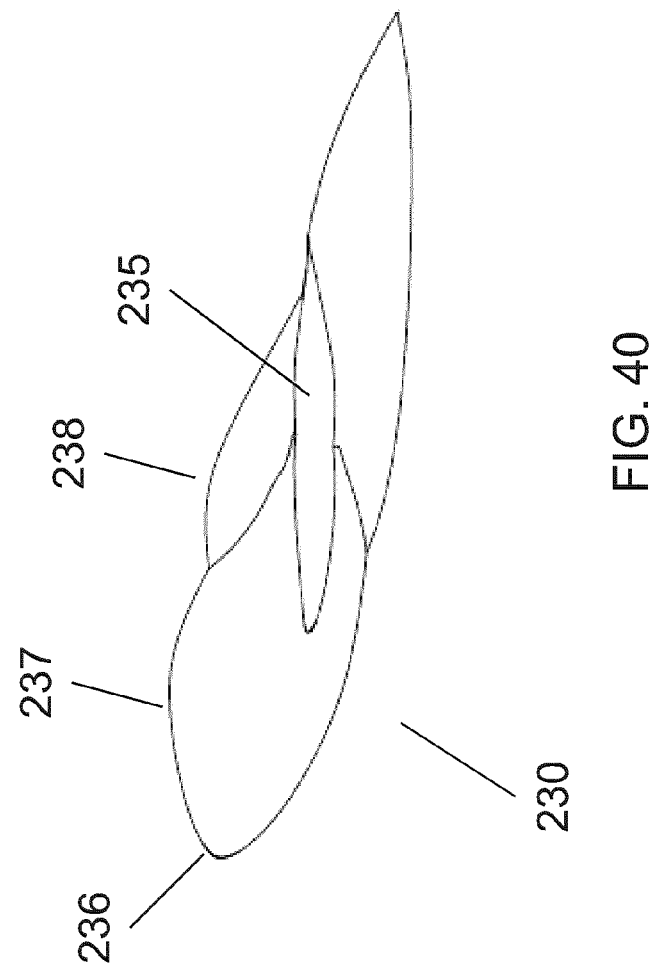
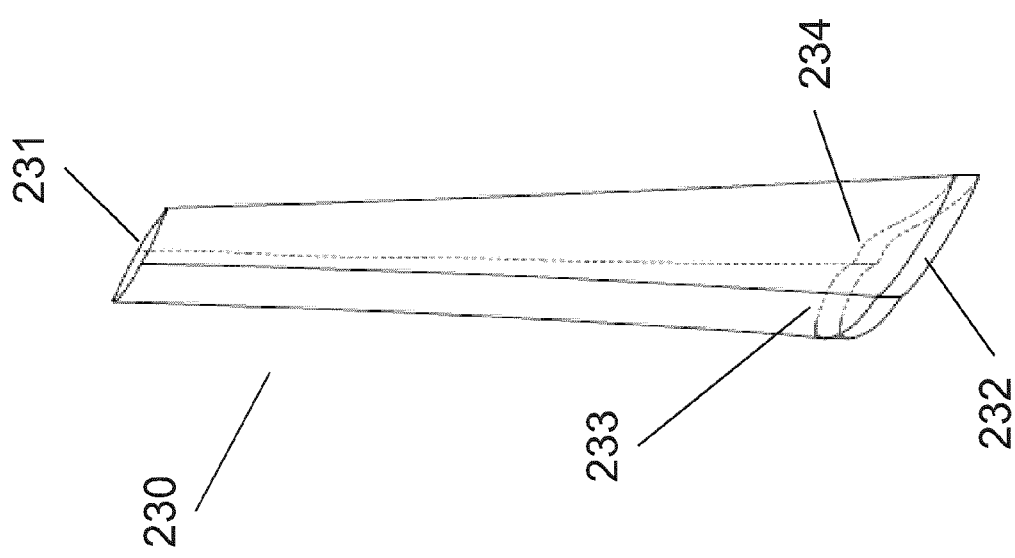

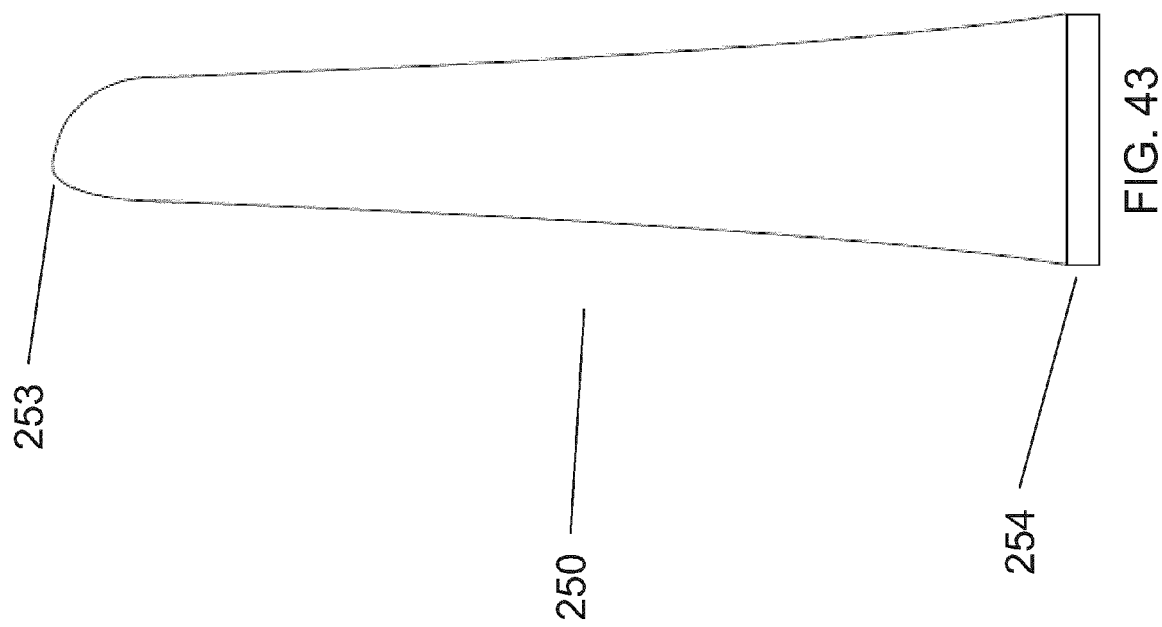

UNIDIRECTIONAL HYDRO TURBINE WITH ENHANCED DUCT, BLADES AND GENERATOR

1. RELATED APPLICATIONS

The present invention claims priority to previously filed U.S. Provisional Patent Application No. 61/330,268 filed Apr. 30, 2010, the contents of which are herein incorporated by reference in their entirety.

2. TECHNICAL FIELD

The present invention relates generally to unidirectional hydro turbines adapted for use in unidirectional water flow environments. More particularly, the present invention relates to hydro turbines adapted for use in unidirectional water flows and having enhanced outer duct arrangements, turbine blade designs, and magnetic generator configurations, and an arrangement for connecting such turbines to an electrical distribution system.

3. BACKGROUND OF THE INVENTION

Underwater hydro turbines for generating electrical power from water flows are known in the art. In particular, underwater hydro turbines have been devised for use in unidirectional and bidirectional water flow applications, such as in river and ocean currents and tidal water flows. Due to the increased demand for sustainable power generation, and the desire to reduce the costs of sustainable power generation towards prices of conventional non-sustainable power sources, there is a desire to improve the efficiency and performance of underwater hydro turbine generators, and to reduce their capital, operating and maintenance costs.

U.S. Pat. No. 7,471,009 to Davis et al. discloses a bidirectional hydro turbine generator for generating electrical power from a water flow. The Davis reference discloses a cylindrical housing or duct around the turbine, which accepted water flow from either end, and included symmetrical hydrofoil turbine blades. The Davis reference also discloses a hydro turbine with a dual-sided axial-flux magnetic generator adapted for use in bidirectional fluid flow applications. Certain disclosed embodiments also include guide vanes located on both sides of the turbine to direct water flow onto the turbine blades in bidirectional fluid flow applications.

U.S. Pat. No. 4,025,220 to Thompson discloses a unidirectional hydro turbine for generating electrical power from water flow. The Thompson reference discloses an axial flow unidirectional turbine enclosed within a rigid venturi nozzle and including a flexible fabric flow collector duct extending upstream of the turbine to attempt to capture water flow in a funnel shaped collector duct arrangement.

European Patent Application Publication No. EP 2112370A1 to Spooner et al. discloses a hydro turbine generator for generating electrical power from water flow including at least one set of passive magnetic bearings. In the Spooner reference, one or more sets of passive magnetic bearings are used to support the generator turbine through the repulsion or attraction of opposite pairs of passive magnets, which are separate from the turbine electrical generator components.

The current technology for hydro turbine generators is unsatisfactory for providing a unidirectional hydro turbine generator design which is advantageously configured for efficient and cost-effective electrical generation in unidirectional fluid flow environments, such as river or ocean currents.

There is a need therefore for a unidirectional hydro turbine generator which provides improved efficiency and performance of the turbine and generator components, for improved reliability and longevity in aggressive and/or corrosive submerged operating environments, or for reduced complexity and cost of manufacture, operation or maintenance.

4. SUMMARY OF THE INVENTION

It is an object of the present invention to implement an apparatus for a hydro turbine generator that overcomes some of the disadvantages of the prior art. More particularly, another object of the present invention is to provide a unidirectional hydro turbine apparatus for flooded use in unidirectional water flow environments that addresses some of the limitations of the prior art.

According to one embodiment of the present invention, a hydro turbine generator apparatus for generating electrical power from water flow is provided. In this embodiment, the hydro turbine generator comprises:

a rotor comprising a hub and a plurality of hydro turbine blades extending radially outward from said hub; and a duct characterized by at least one of an inlet and an outlet end of said duct being oblong in elevation;

wherein a ratio of a cross-sectional outlet area of said duct to a cross-sectional inlet area of said duct is between 1.1 and 2.1.

Other objects according to certain embodiments of the present invention include providing a highly efficient hydro turbine suitable for shallow river applications as well as deep ocean current locations with a relatively simple design which is environmentally friendly.

Another object of certain embodiments of the present invention is to provide a low profile design for efficient operation in shallow fluid streams or areas of low water depth.

Another object of the present invention according to certain embodiments is to provide flow enhancement features including intake hoods and vents, downstream diffuser cut-outs, and a beveled face inlet flow enhancer to improve the performance of the turbine.

A further object of the present invention according to one embodiment is to provide a slope or flare to the interior surface of the diffuser which improves flow characteristics and therefore performance.

Yet a further object of the present invention according to certain embodiments is to provide a hydro turbine generator with an enhanced turbine blade design incorporating one or more tapered and/or raked turbine blades.

A further object of the present invention according to an embodiment thereof is to provide a hydro turbine generator with one or more turbine blades comprising multiple beaded surface features to improve the efficiency and performance of the turbine.

Another object of the present invention according to one embodiment is to provide a hydro turbine generator including a single-sided axial-flux magnetic generator which provides an axial bearing function to support at least a portion of an axial bearing load.

A further object according to an embodiment of the invention is to provide a hydro turbine generator including a radial-flux magnetic generator which provides at least a radial bearing function to support at least a portion of a radial bearing load.

Yet a further object according to an embodiment of the invention is to provide a hydro turbine generator including an angular-flux magnetic generator which provides a radial and/_ or axial bearing function to support at least a portion of a radial and/or an axial bearing load.

Another object according to an embodiment of the present invention is to provide an arrangement for connecting one or more such unidirectional hydro turbine generating units of the present invention to a shore-located electrical distribution system that addresses some of the limitations of the prior art.

Further advantages of the invention will become apparent when considering the drawings in conjunction with the detailed description.

5. BRIEF DESCRIPTION OF THE DRAWINGS

The apparatus and method of the present invention will now be described with reference to the accompanying drawing figures, in which:

FIG. 7 is a rear elevation view of the diffuser duct with a circular inlet and outlet in a unidirectional turbine according to the invention.

FIG. 29 is a plan cross section view of a single turbine generator unit with longitudinal hole through the hub in a ducted unidirectional turbine according to the invention.

FIG. 34 is a perspective view of a hydro turbine blade with a raked tip section, according to an embodiment of the present invention.

FIG. 35 is a plan view of the exemplary hydro turbine blade shown in FIG. 34 according to an embodiment of the invention.

FIG. 36 is a front view of the exemplary hydro turbine blade shown in FIG. 34 according to an embodiment of the invention.

FIG. 37 is a side elevation view of the exemplary hydro turbine blade shown in FIG. 34 according to an embodiment of the invention.

FIG. 39 is a perspective view of a cambered hydro turbine blade comprising multiply beaded surface features according to an embodiment of the present invention.

FIG. 40 is a plan view of the exemplary hydro turbine blade shown in FIG. 39 according to an embodiment of the invention.

FIG. 43 is a rear view of an exemplary hydro turbine blade comprising a tapered tip, according to an embodiment of the present invention.

6. DETAILED DESCRIPTION OF THE INVENTION

Figure 1:
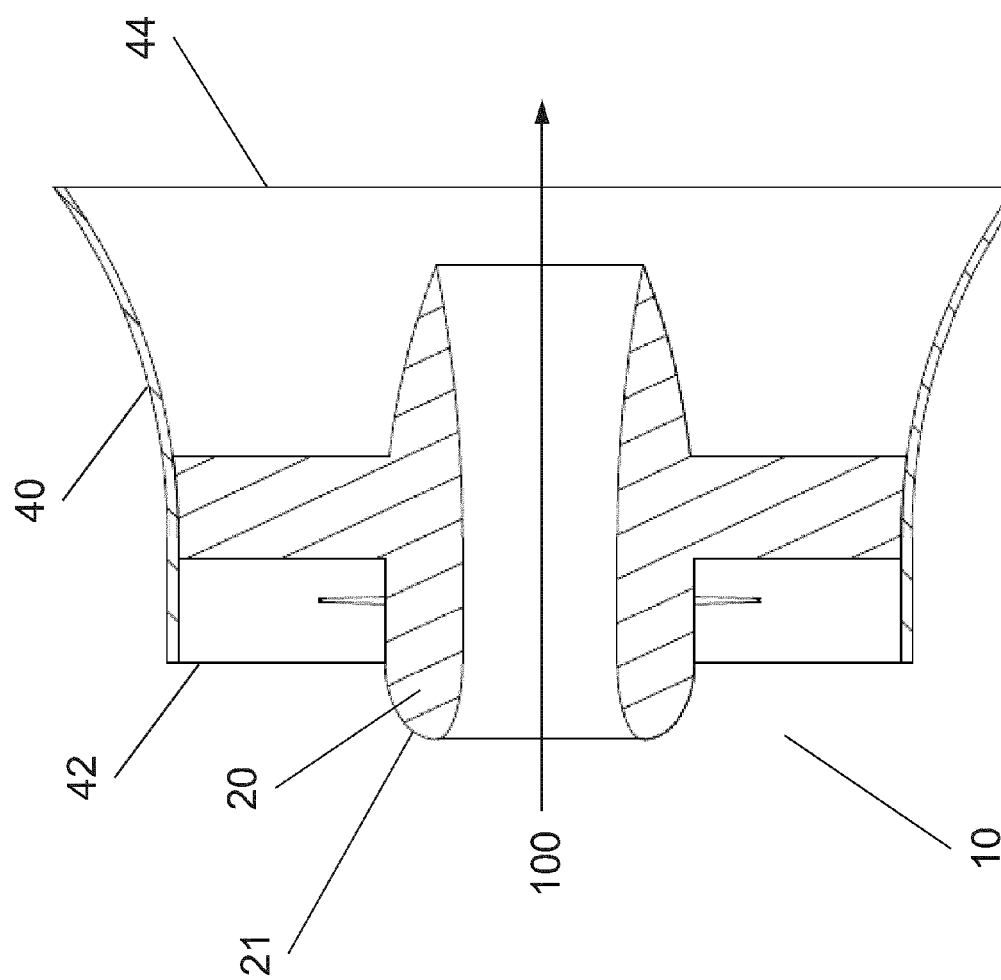
FIG. 1 is a plan cross-section view of a unidirectional turbine with diffuser according to the invention.

Referring to FIG. 1, a plan elevation cross-sectional view of the preferred embodiment of the invention is shown. The unidirectional turbine generator unit 10 with diffuser duct 40 may be used as a single turbine generator unit 10 or with a plurality of turbine generator units 10, typically deployed in river environments, although the design may be used in other environments such as sub-sea tidal areas, tail-races or in wind energy units. The unit 10 may also be employed as a unidirectional ocean circulation or current turbine, in other unidirectional free flow applications, or reciprocally for propellers or pumps or systems which operate in both turbine mode and propeller/pump modes. The purpose of the turbine generator unit 10 is to efficiently generate electrical power using water flow with minimal environmental impact. The preferred embodiment is optimized for river and/or ocean deployment. It will be apparent that the present invention provides an efficient power generator unit with improved hydrodynamic, generator, bearing and blade design features resulting in a highly efficient and non-complex (from the perspective of manufacture, maintenance, and operation) design suitable for shallow river applications as well as deep ocean current locations and is environmentally friendly.

The turbine generator unit 10 has two ends about a center line, with an intake, upstream or inlet end on one hand, and an outflow, downstream or outlet end on the other. A hub 20 with an axis substantially parallel to the direction of water flow 100 is disposed along the central longitudinal axis of the turbine generator 10. The hub 20 has a hub nose 21 at the inlet end which may be advantageously formed in any hydrodynamic shape. The hub nose 21 may be ogive shaped or have ogive shaped caps in order to minimize drag into and out of the duct 40. A series of vanes are located upstream and/or downstream of turbine blades and are disposed radially about the hub 20. Any suitable number of vanes may be implemented such as may be determined according to hydrodynamic and structural requirements for a particular application. The central hub preferably includes a longitudinal hole defined by the interior walls of the hub 20. The interior walls of the hub 20 may form a cylinder of constant internal diameter. In an optional embodiment, the interior walls of the hub 20 may converge in order to increase the velocity of water flowing through the longitudinal hole in a venturi effect. In one such optional embodiment, the convergence of the interior walls to a narrow central portion is at a sharper or steeper angle on the inlet end versus a more gradual, flared divergence of the interior walls of the hub 20 towards the outlet end. The longitudinal or central hole functions to reduce the resulting flow separation downstream of the hub 20 and therefore increases the total mass flow through the turbine annulus or flow area. In a variation, there is no central hole, which permits a smaller bearing configuration.

The diffuser duct 40 is a hollow cylinder disposed about the longitudinal axis of the hub 20 to form a duct and house a radially oriented rotor. The duct 40 may be a cylinder of constant or converging internal diameter, or, optionally, the interior walls may diverge in order to increase the mass flow of water flowing through the duct 40. Additionally, the duct 40 includes an opening at the intake end or inlet 42 and an opening at the outflow end or outlet 44. In a particular embodiment the inlet 42 is circular in an elevation view and the outlet 44 is oblong, in order to minimize the height profile of the turbine 10 in potentially relatively shallow sites, or sites with navigational clearance restrictions (such as rivers or seaways for example) while maximizing flow, turbine blade diameter and therefore power output. The vertical dimension of the duct is therefore less than the horizontal dimension. Alternatively the two ends or fore/upstream intake or inlet 42 and aft/downstream outlet 44 may be substantially circular, oblong, obround, elliptical, or any combination thereof.

In one embodiment of the invention, the inlet 42 of the duct 40 may define a cross-sectional inlet area, and the outlet 44 of the duct 40 may define a cross-sectional outlet area. In such embodiment, the cross-sectional inlet and outlet areas of the duct 40 may desirably be sized so as to optimize the hydrodynamic efficiency of the hydro turbine generator unit 10, as may be desirably for optimizing power generation for particular unidirectional water flow environments, such as installation either singly, or more desirably in an array of generator units 10 as may be found in a generator farm, for example. In such an embodiment, design characteristics relating the cross-sectional inlet and outlet areas have been determined and are herein disclosed which exhibit optimal hydrodynamic flow and therefore power generation performance. The optimal range of the ratio of the cross-sectional outlet area to the inlet area ($A_{outlet}/A_{inlet}$) of the duct 40 has been found to be between 1.1 and 2.1, according to a preferred embodiment of the invention. The geometric range of outlet to inlet areas of duct 40 described above may desirably provide benefits associated with diffusing water flow through and downstream of the generator unit 10, while avoiding potential negative impacts of undesirably large duct outlet designs. Therefore the geometric range of ($A_{outlet}/A_{inlet}$) for the duct 40 disclosed above may desirably provide benefits including one or more of: reducing the structural load imposed on the generator by the duct 40, reducing hydrodynamic drag due to the duct 40, reducing manufacturing, deployment and maintenance/replacement cost of the duct 40, reducing overall depth and length of the duct 40, and reducing generation of downstream turbulence, which may also desirably reduce the effect of an upstream generator unit on one or more downstream units such as in a generator array or farm configuration, thereby providing for optimal exploitation of a unidirectional fluid flow resource.

Figure 2:
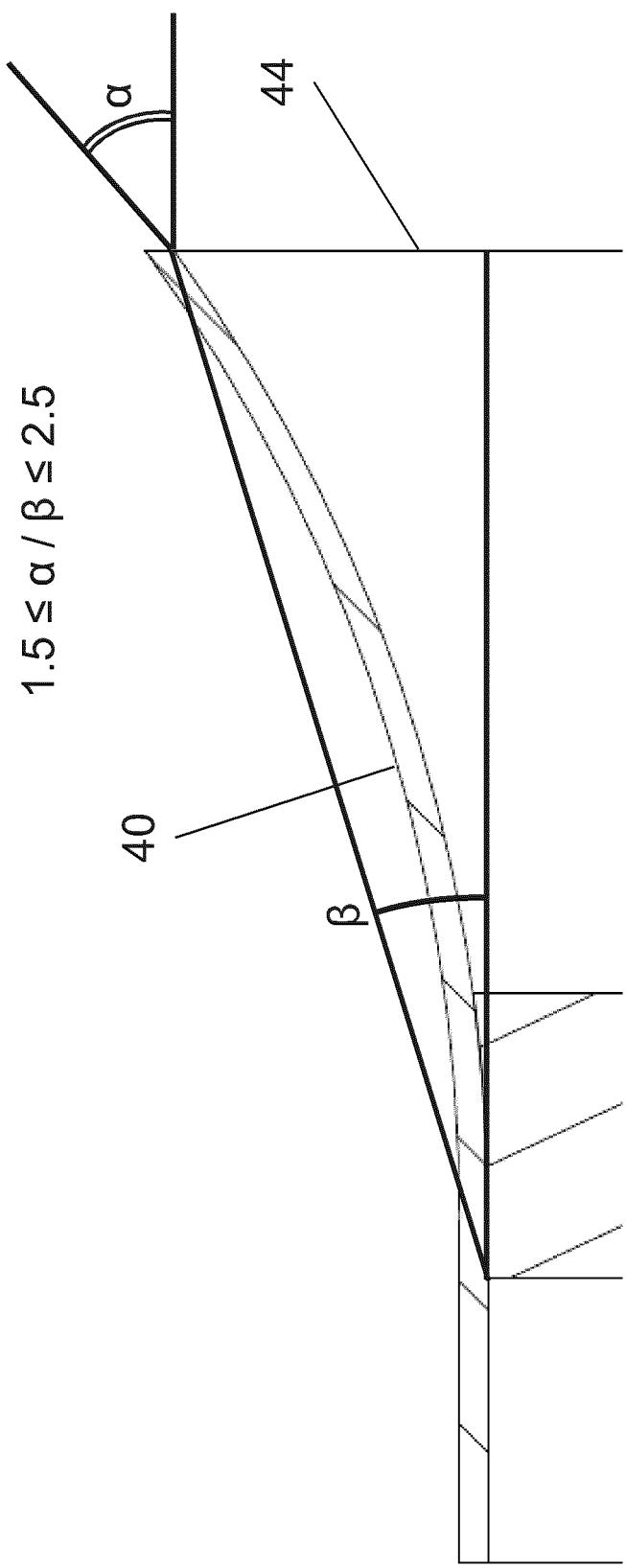
FIG. 2 is a cross-sectional view of the diffuser duct curvature in a unidirectional turbine according to the invention.
Figure 4:
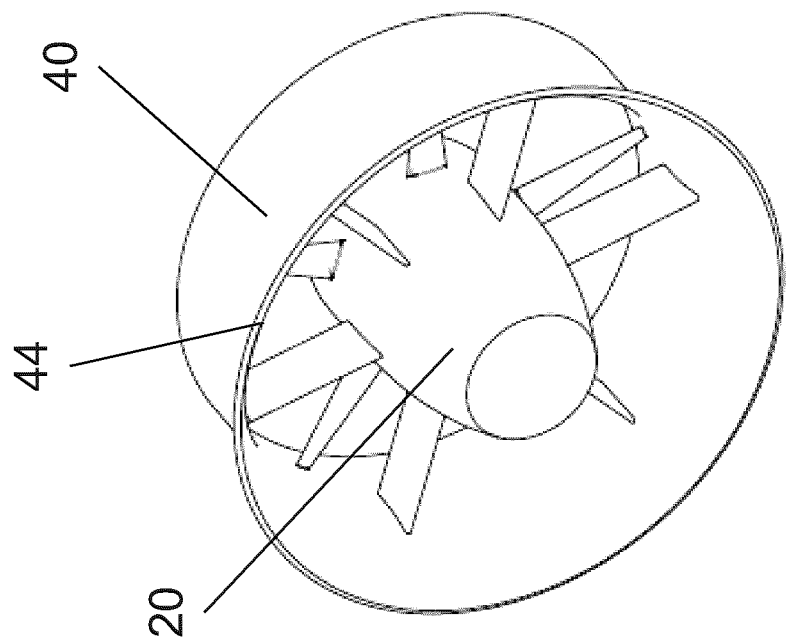
FIG. 4 is an isometric view of the diffuser duct with a circular inlet and outlet in a unidirectional turbine according to the invention.
Figure 3:
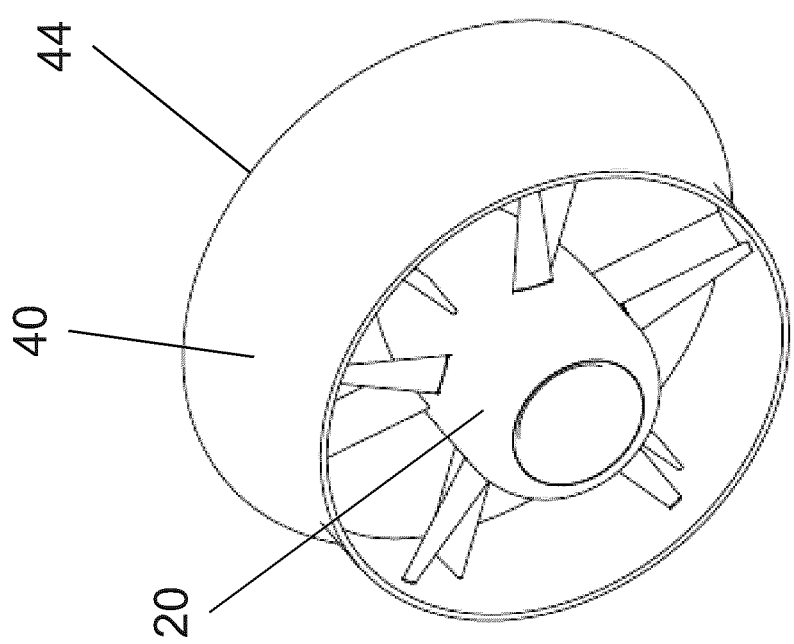
FIG. 3 is an isometric view of the diffuser duct with a circular inlet and outlet in a unidirectional turbine according to the invention.
Figure 6:
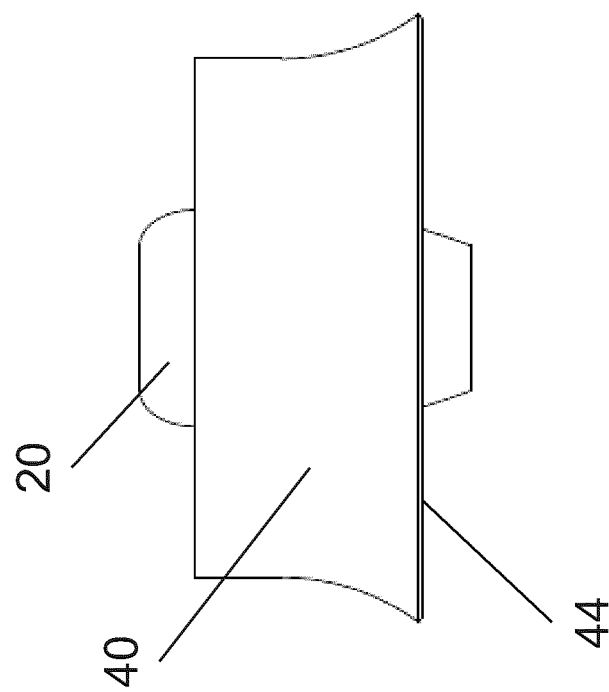
FIG. 6 is a plan view of the diffuser duct with a circular inlet and outlet in a unidirectional turbine according to the invention.
Figure 5:
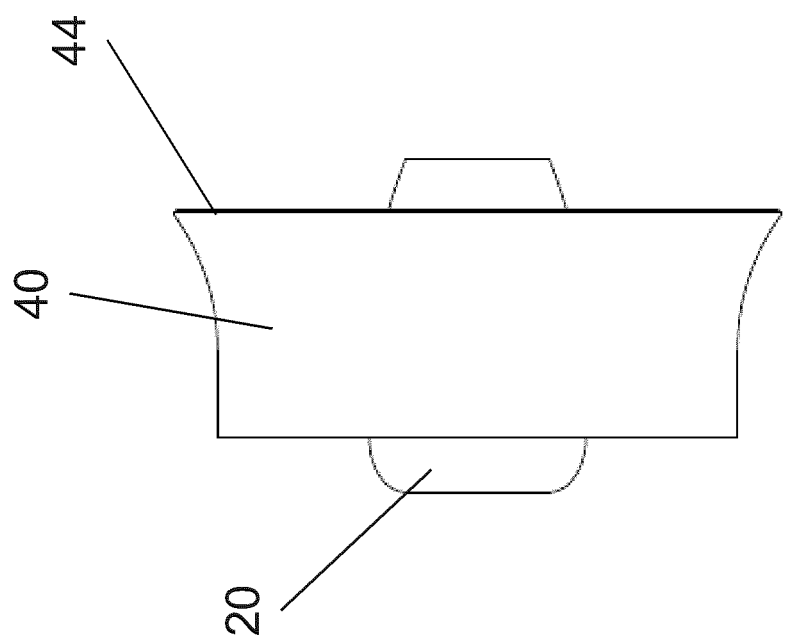
FIG. 5 is a side elevation view of the diffuser duct with a circular inlet and outlet in a unidirectional turbine according to the invention.
Figure 9:
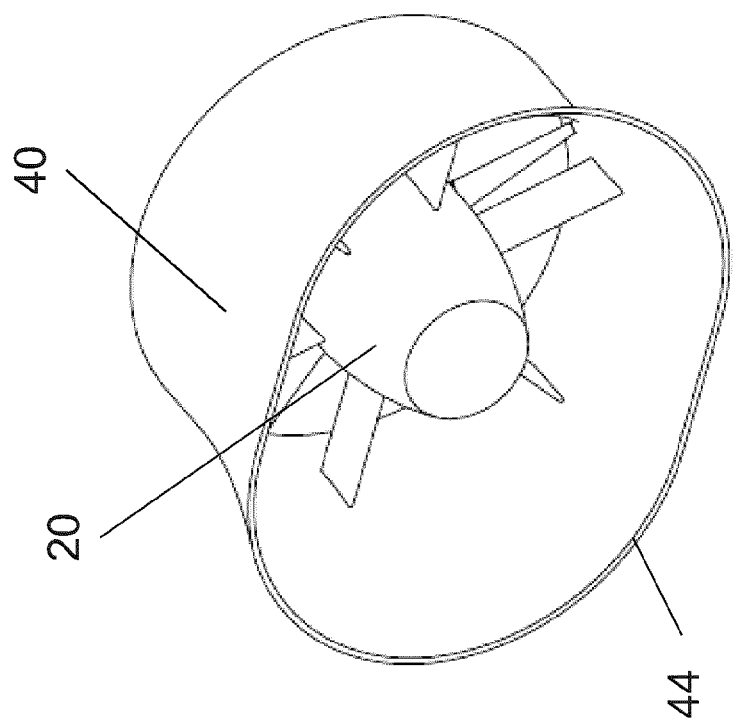
FIG. 9 is an isometric view of the diffuser duct with a circular inlet and an oblong outlet in a unidirectional turbine according to the invention.
Figure 8:
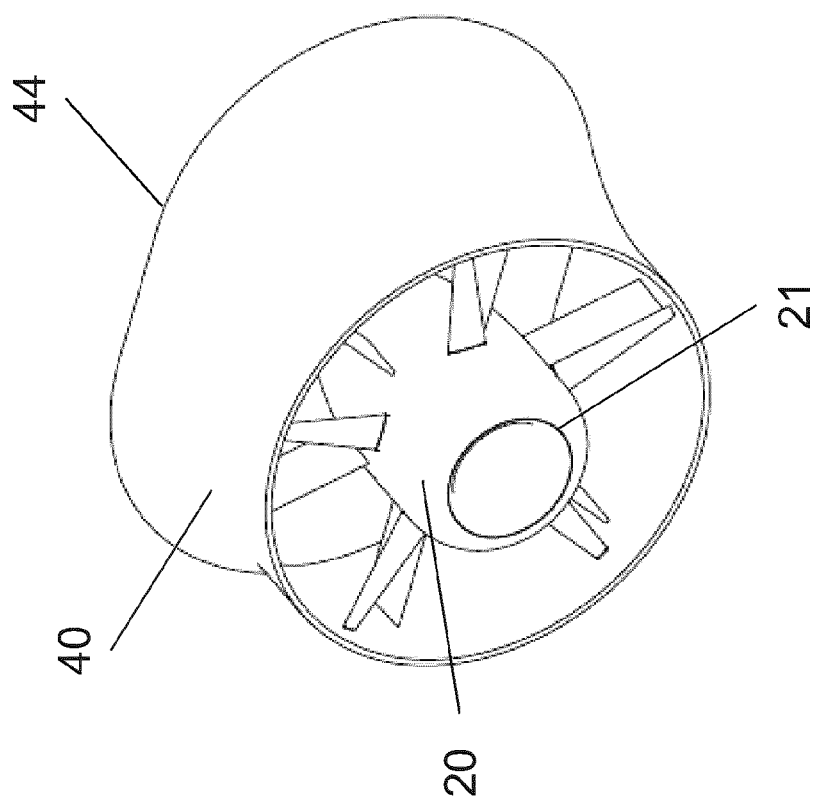
FIG. 8 is an isometric view of the diffuser duct with a circular inlet and an oblong outlet in a unidirectional turbine according to the invention.
Figure 11:
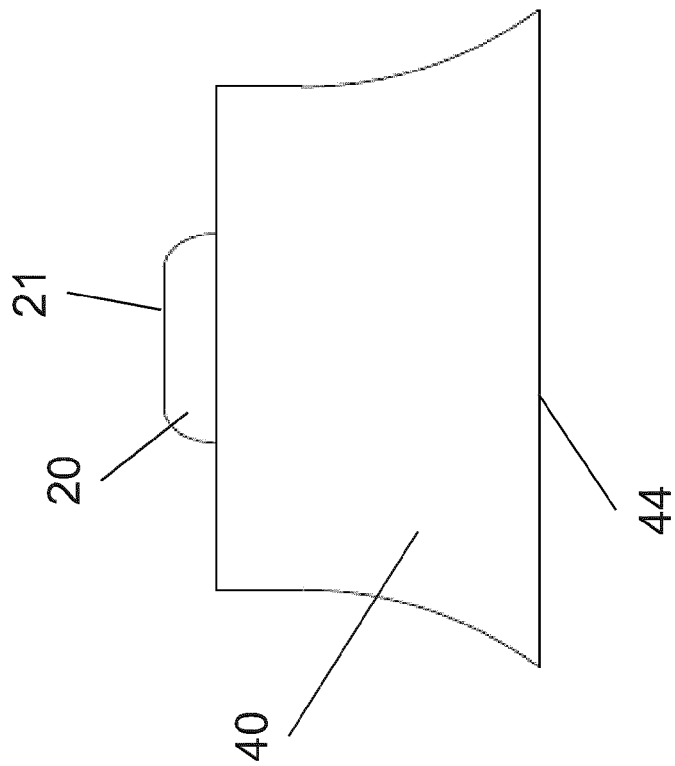
FIG. 11 is a plan view of the diffuser duct with a circular inlet and an oblong outlet in a unidirectional turbine according to the invention.
Figure 10:
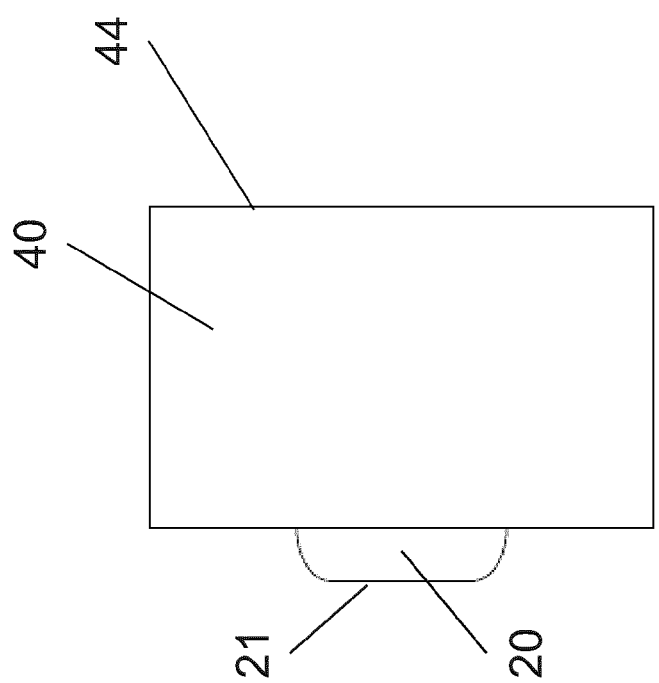
FIG. 10 is a side elevation view of the diffuser duct with a circular inlet and an oblong outlet in a unidirectional turbine according to the invention.
Figure 12:
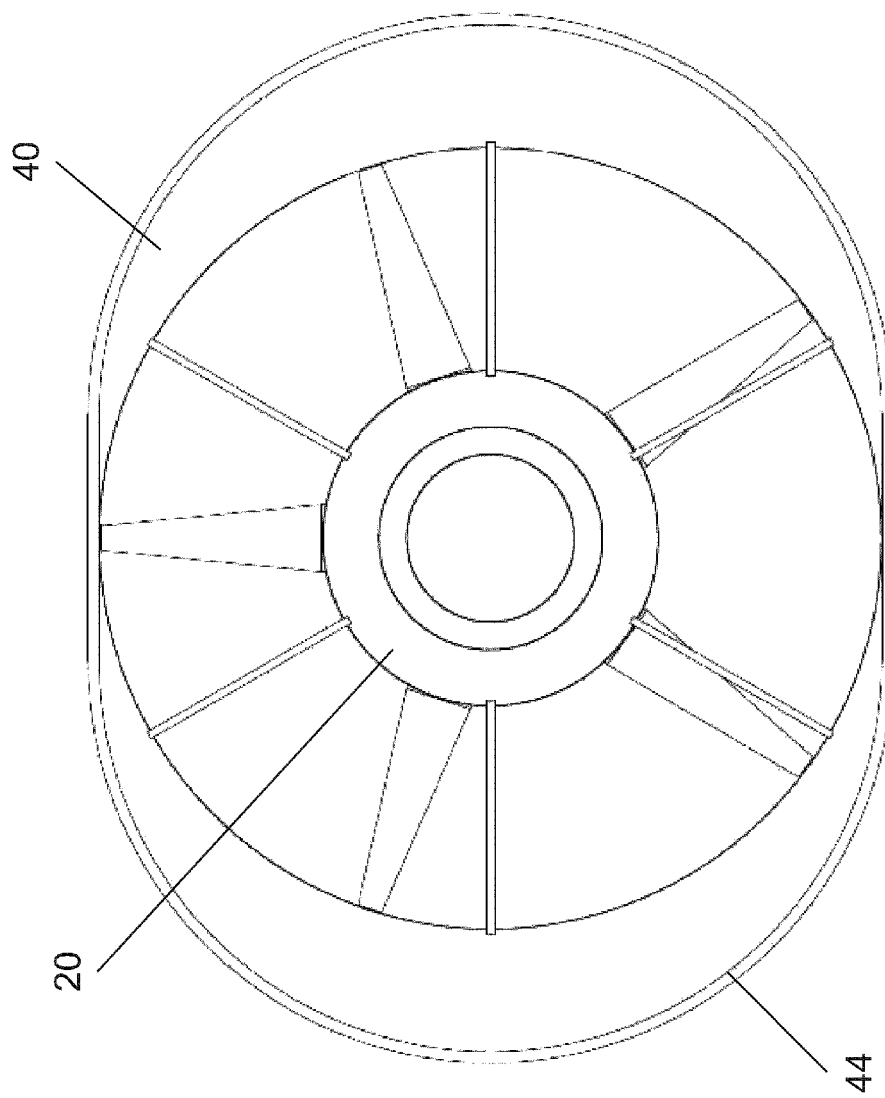
FIG. 12 is a rear elevation view of the diffuser duct with a circular inlet and an oblong outlet in a unidirectional turbine according to the invention.
Figure 14:
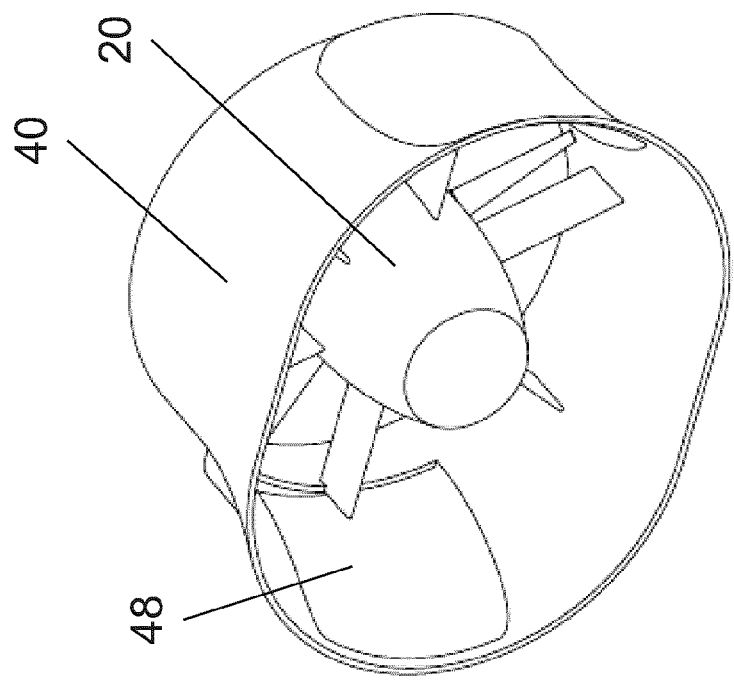
FIG. 14 is an isometric view of the diffuser duct with lateral intake hoods and vents in a unidirectional turbine according to the invention.
Figure 13:
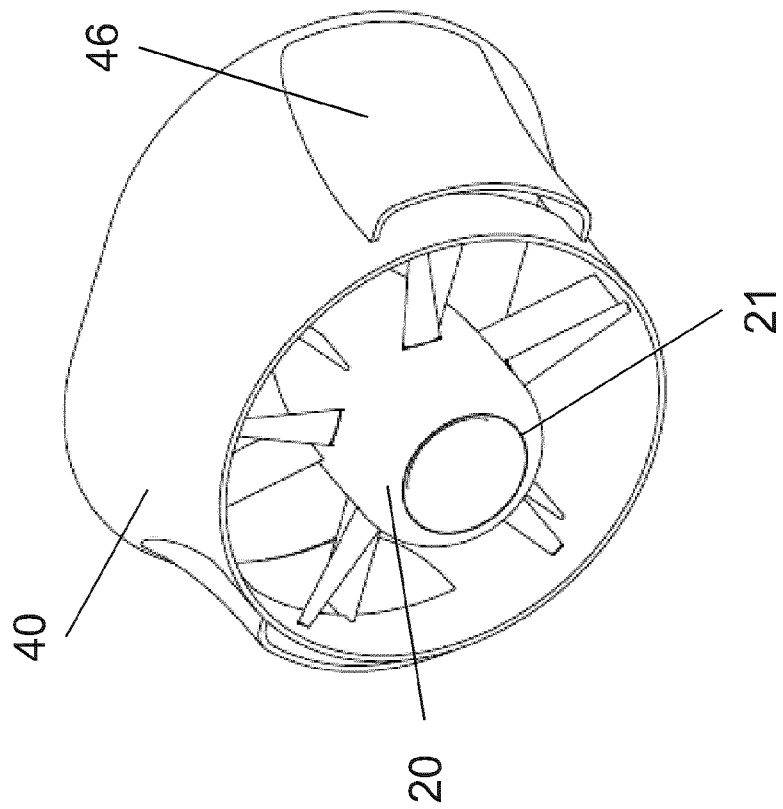
FIG. 13 is an isometric view of the diffuser duct with lateral intake hoods and vents in a unidirectional turbine according to the invention.
Figure 16:
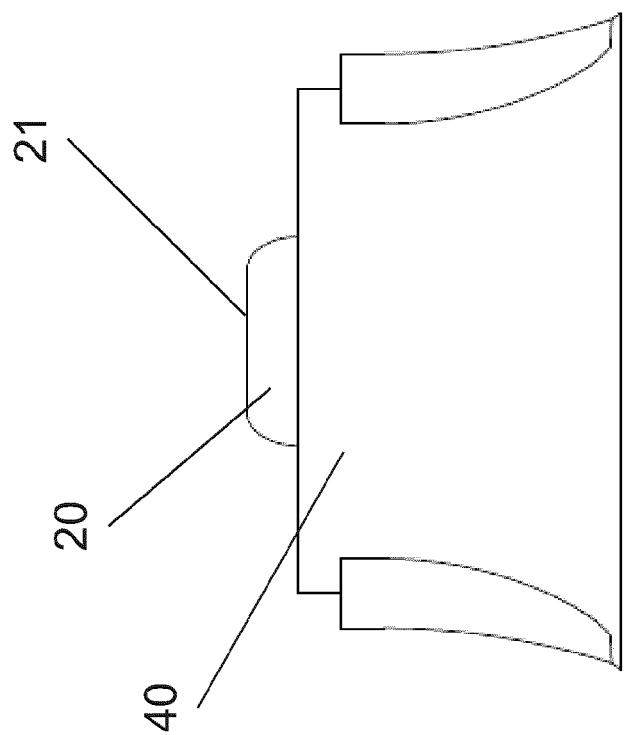
FIG. 16 is a plan view of the diffuser duct with lateral intake hoods and vents in a unidirectional turbine according to the invention.
Figure 15:
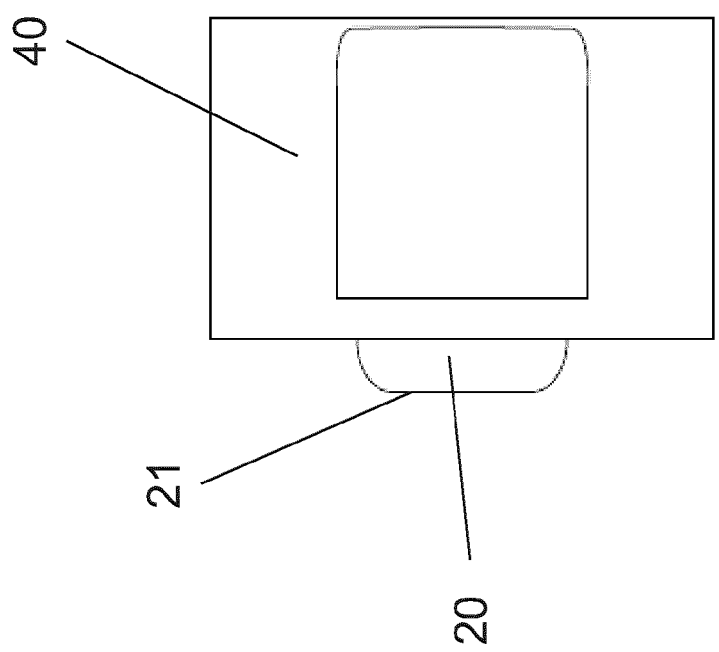
FIG. 15 is a side elevation view of the diffuser duct with lateral intake hoods and vents in a unidirectional turbine according to the invention.
Figure 17:
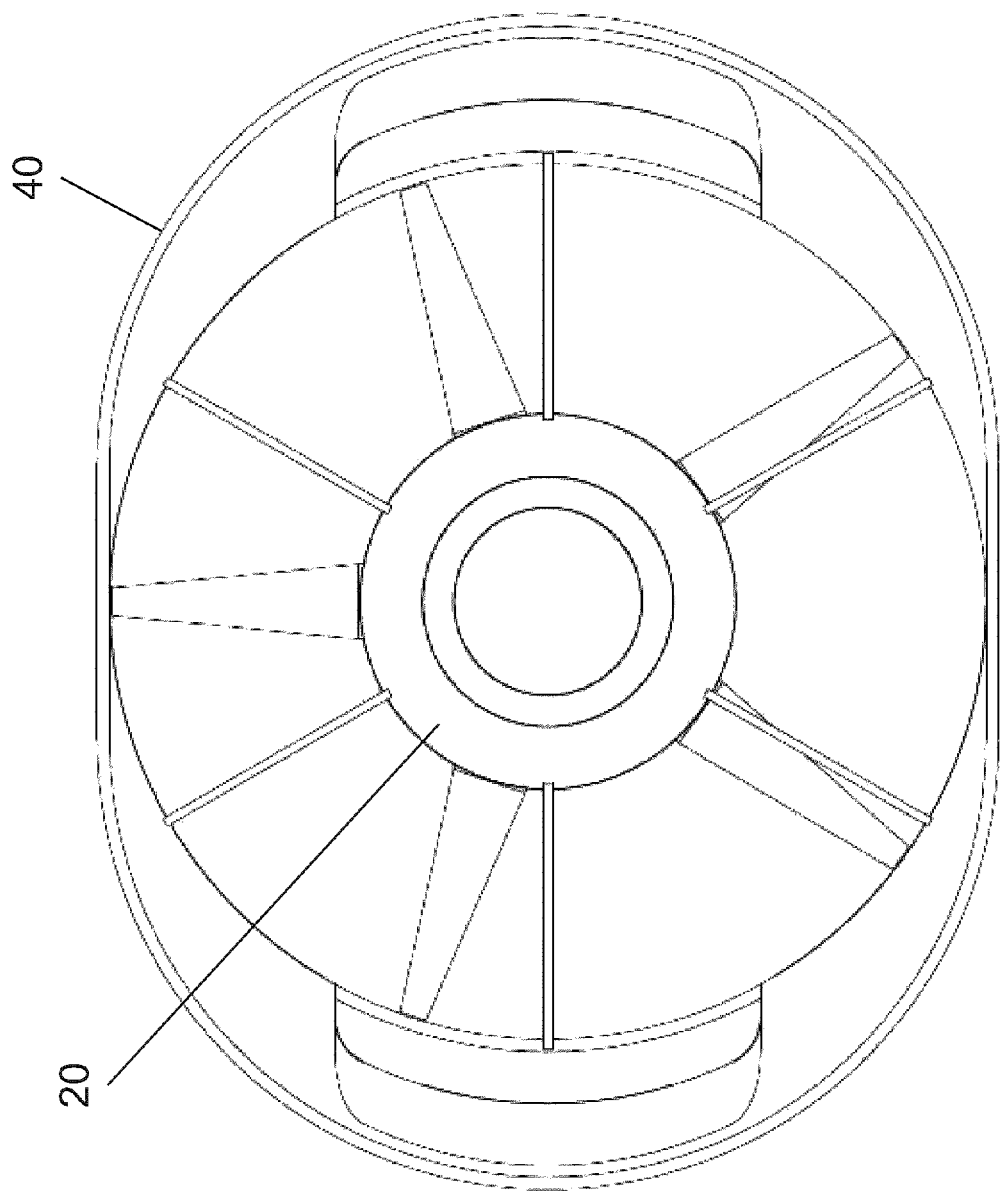
FIG. 17 is a rear elevation view of the diffuser duct with lateral intake hoods and vents in a unidirectional turbine according to the invention.
Figure 19:
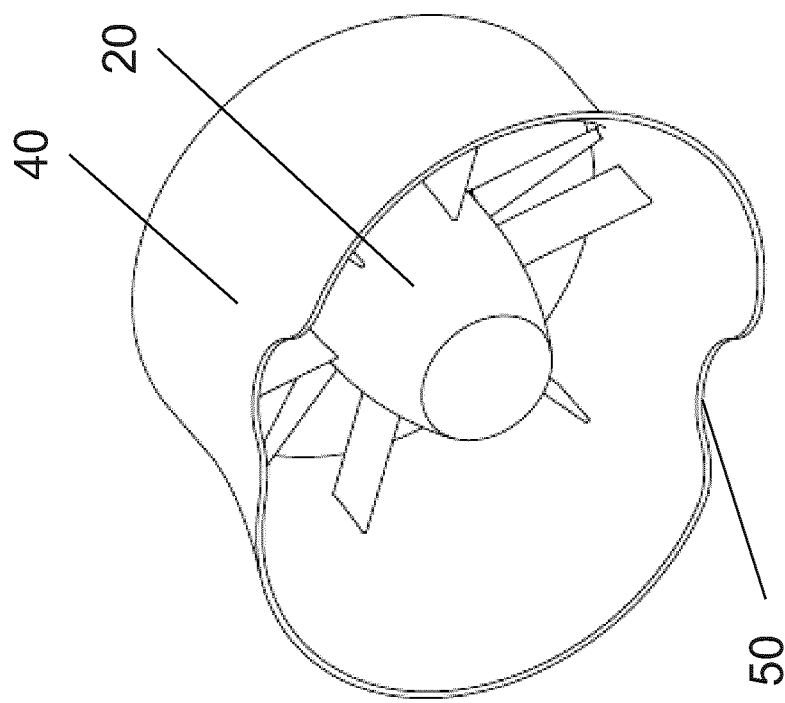
FIG. 19 is an isometric view of the diffuser duct with aft diffusion cut-outs in a unidirectional turbine according to the invention.
Figure 18:
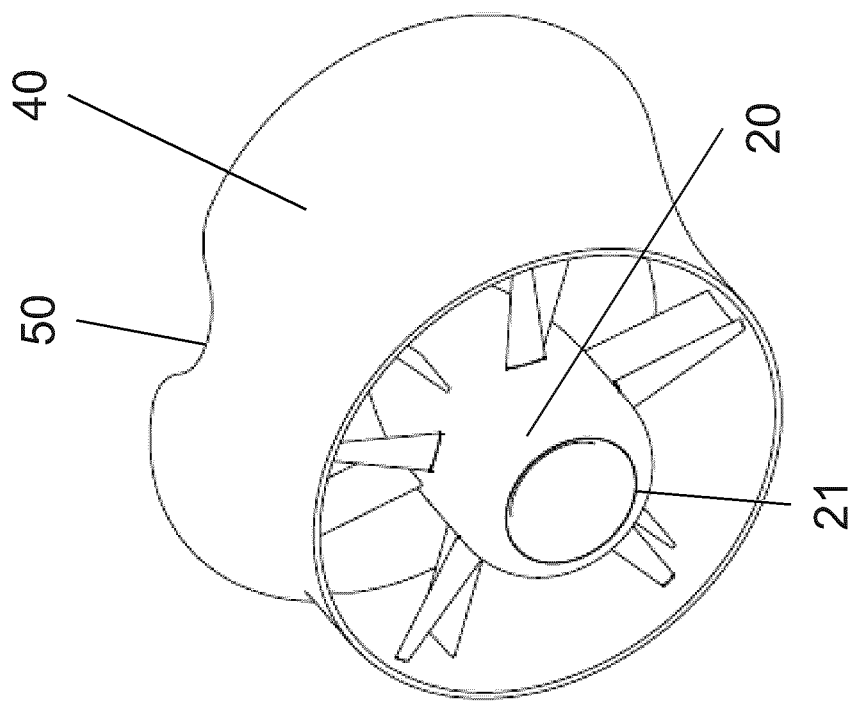
FIG. 18 is an isometric view of the diffuser duct with aft diffusion cut-outs in a unidirectional turbine according to the invention.
Figure 21:
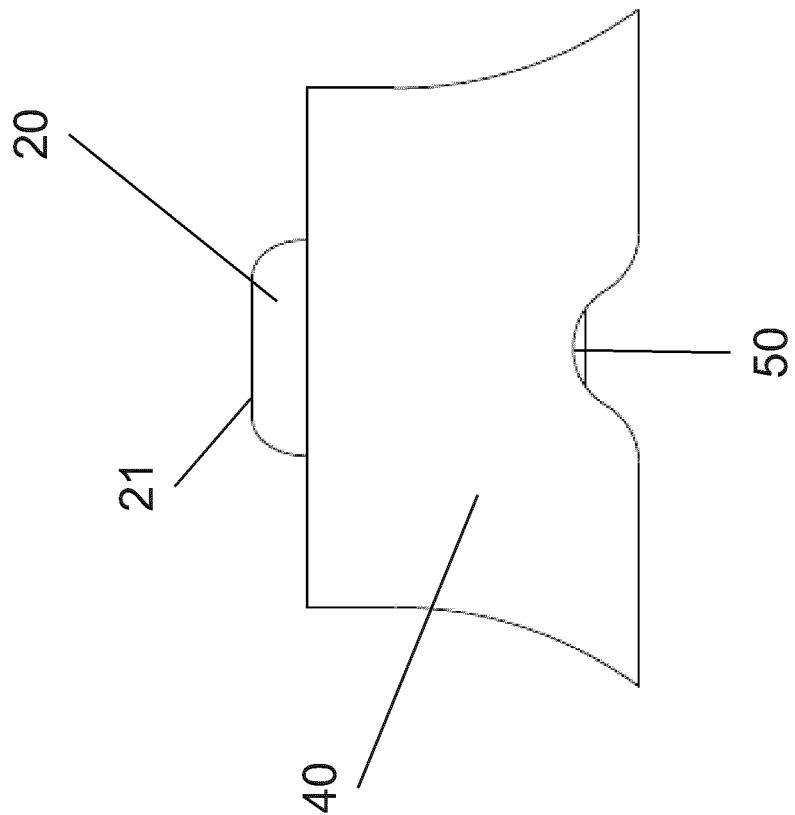
FIG. 21 is a plan view of the diffuser duct with aft diffusion cut-outs in a unidirectional turbine according to the invention.
Figure 20:
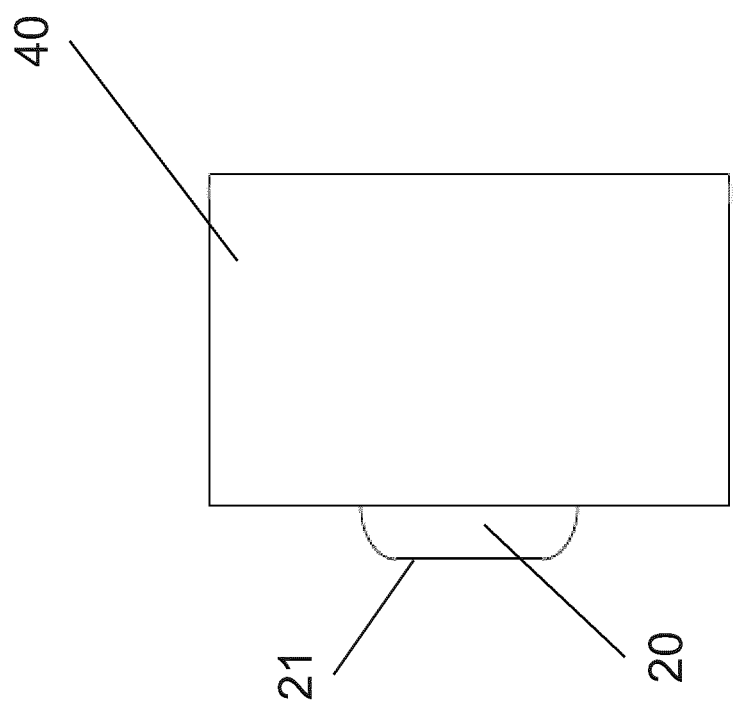
FIG. 20 is a side elevation view of the diffuser duct with aft diffusion cut-outs in a unidirectional turbine according to the invention.
Figure 22:
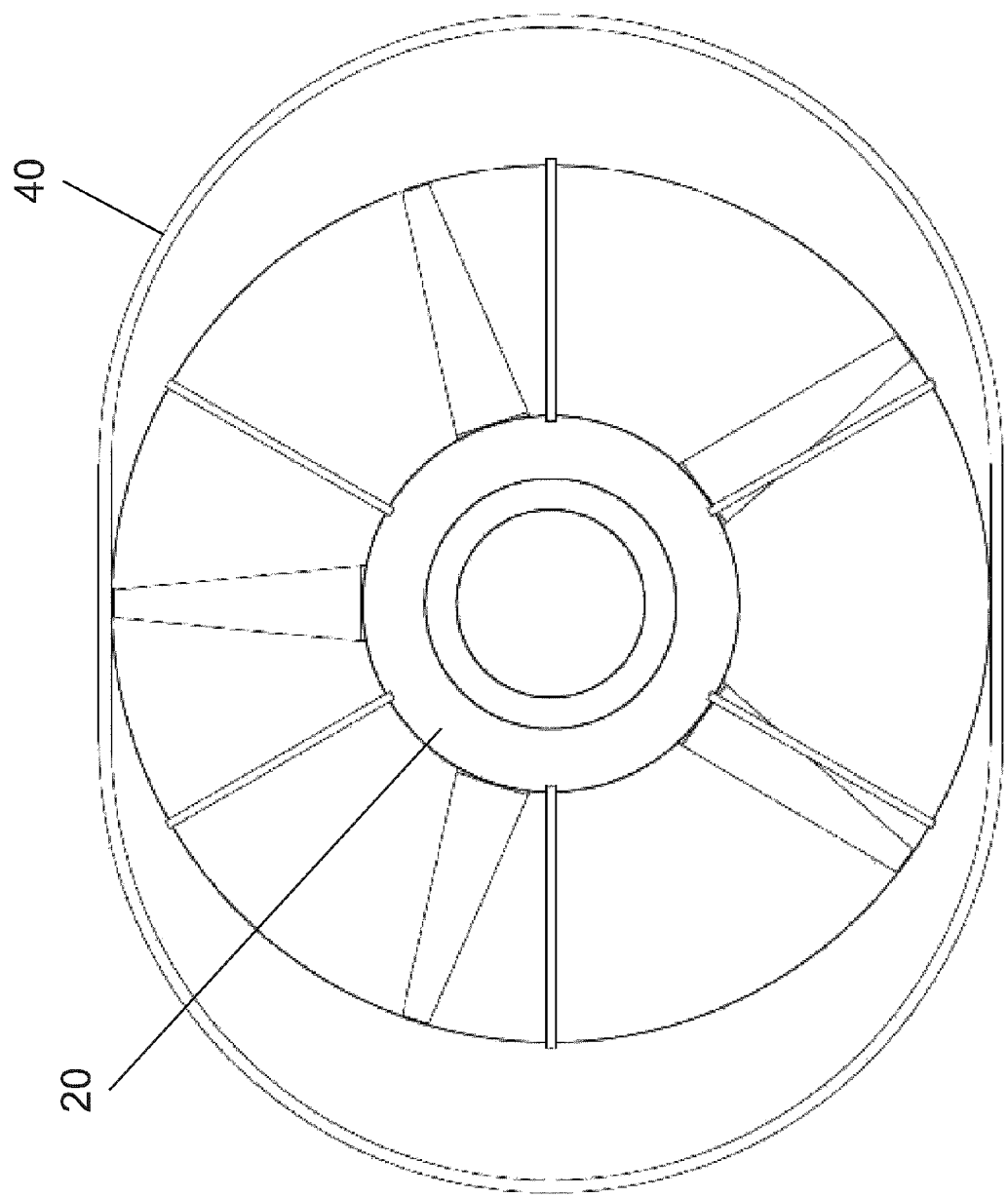
FIG. 22 is a rear elevation view of the diffuser duct with aft diffusion cut-outs in a unidirectional turbine according to the invention.
Figure 24:
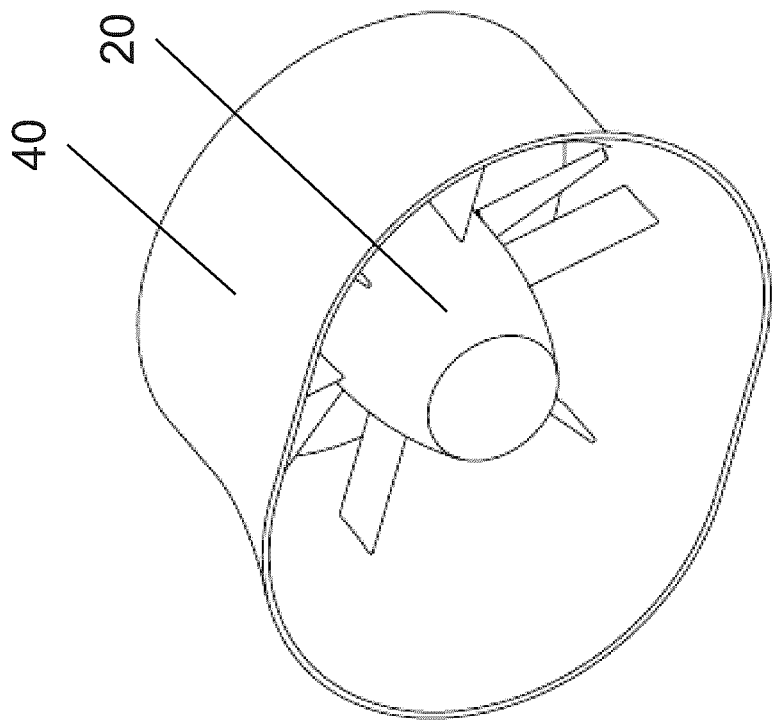
FIG. 24 is an isometric view of the diffuser duct with an oblique face in a unidirectional turbine according to the invention.
Figure 23:
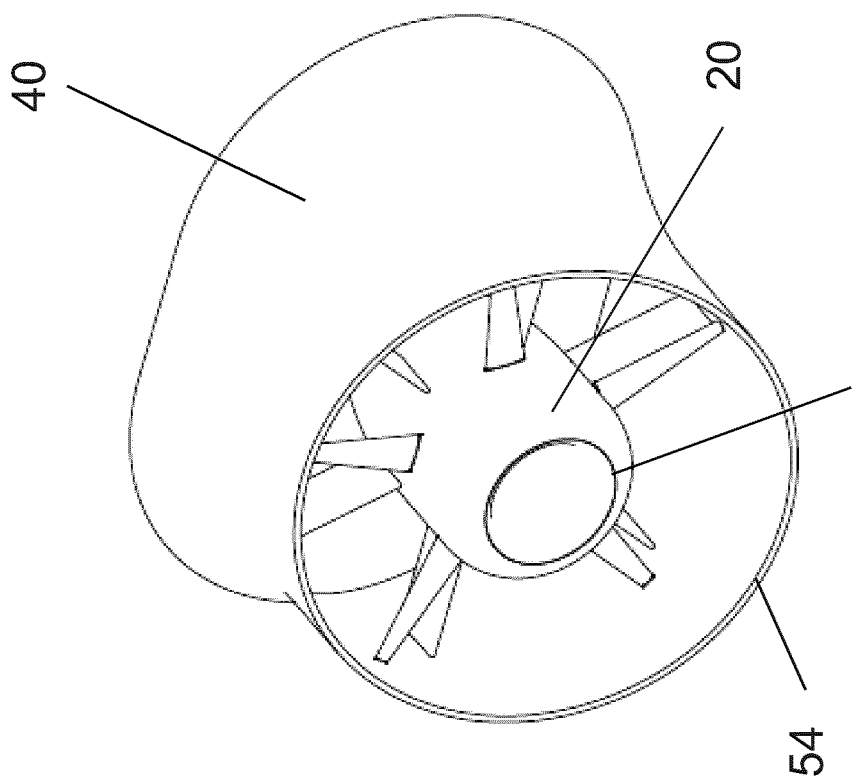
FIG. 23 is an isometric view of the diffuser duct with an oblique face in a unidirectional turbine according to the invention.
Figure 26:
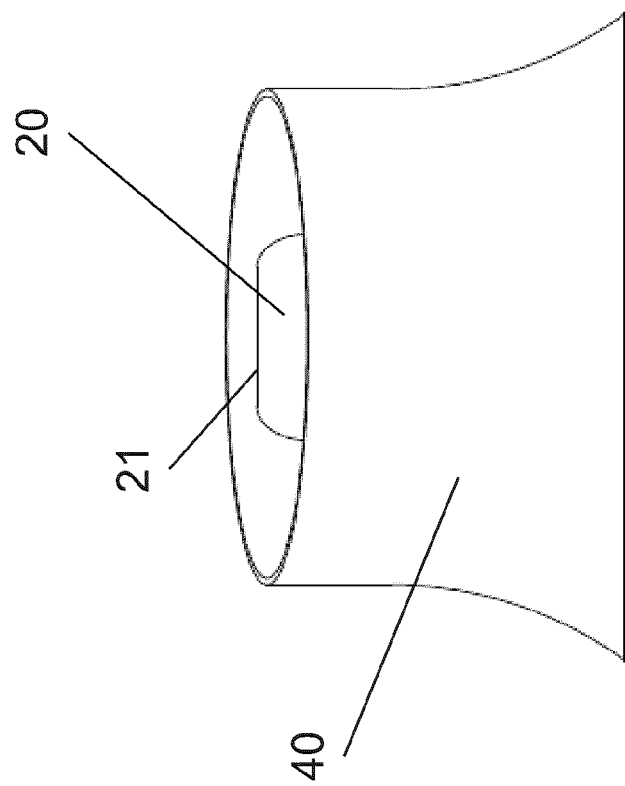
FIG. 26 is a plan view of the diffuser duct with an oblique face in a unidirectional turbine according to the invention.
Figure 25:
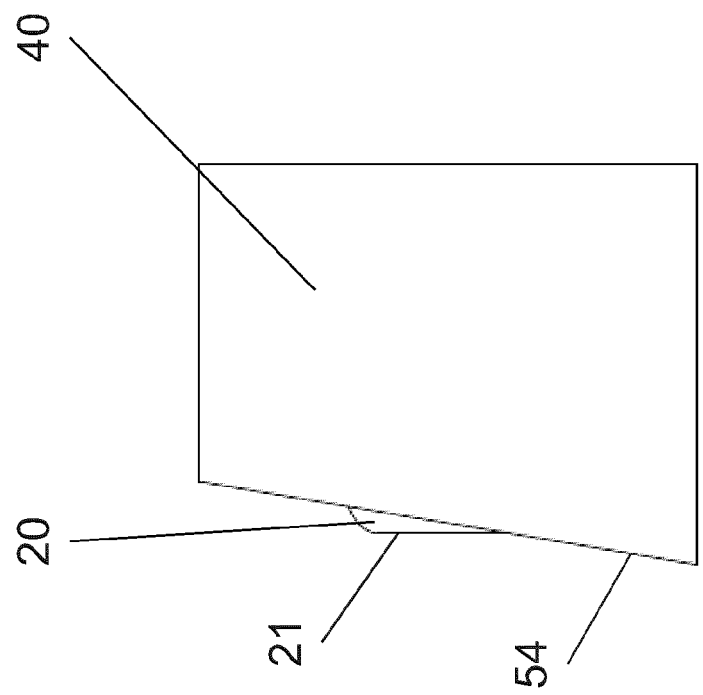
FIG. 25 is a side elevation view of the diffuser duct with an oblique face in a unidirectional turbine according to the invention.
Figure 27:
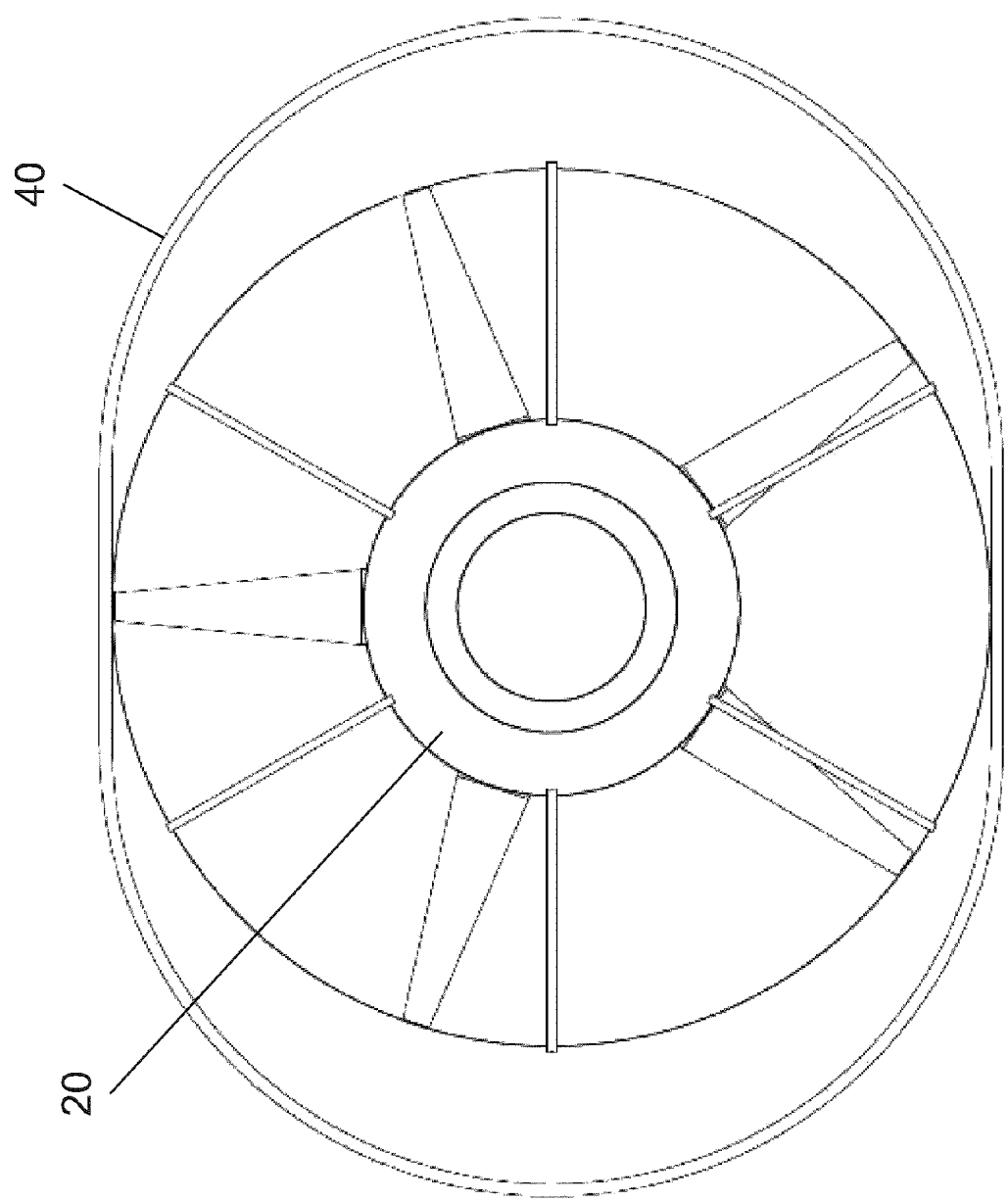
FIG. 27 is a rear elevation view of the diffuser duct with an oblique face in a unidirectional turbine according to the invention.

The flared feature or diverging diameter of the duct 40 may be described by a geometric relationship which maximizes the diffusion efficiency of the duct. In one embodiment, the inlet 42 is substantially circular in the elevation view, and the outlet 44 is oblong. FIG. 2 illustrates the profile of the inner surface of the duct 40 from the start of the flare section of the duct to the downstream or outlet edge. Design characteristics of the duct 40 have been determined and are herein disclosed which exhibit optimal flow and therefore power generation characteristics. The optimal performance range of the duct 40 is achieved when $(1.5 \leq \alpha/\beta \leq 2.5)$ where $\alpha$ and $\beta$ are defined as follows. $\beta$ is the angle of deflection from the central longitudinal axis of the turbine 10 of a line formed along two points, the first point being a point at the start of the flared section of duct 40, and the second point being a point directly downstream (along the longitudinal axis of the turbine 10) from the first, on the interior wall of the duct 40 at the outlet 44 end, shown in FIG. 2. $\alpha$ is the angle of deflection of a line tangential to the inner surface of the duct 40 at the outlet 44, in relation to the longitudinal axis of the turbine 10. If the relationship of alpha over or divided by beta $(\alpha/\beta)$ is smaller than 1.5 as depicted approximately in FIG. 2 below, then the amount of power extracted is reduced. If relationship of $\alpha$ over $\beta$ is greater than the given range, the flow will separate, producing increased structure drag and increased flow disturbance which may affect any subsequent, downstream turbine units 10. The geometric relationship defined above also provides the benefit of ease of manufacture and therefore reduced production costs.

In operation, the diffuser duct 40 produces an augmentation or an increase in the power extracted by the turbine. It is critical that the shape of this duct be defined to maximize the extraction of energy from a given depth of water. For this reason, the diffuser duct may be circular at both ends as depicted in FIGS. 2-7 or it may incorporate an oblong shape for the outlet 44 in order to minimize the vertical height while still maximizing the diffusion capabilities of the duct 40 as depicted in FIGS. 8-12. The maximum blade diameter or length for depth restricted locations is achieved by the oblong diffuser duct 40 outlet 44 with the benefits of improved performance. The diffuser 40 may also optionally incorporate one or more additional features, namely intake vents, aft diffusion cut-outs and an inlet flow enhancer which will further improve the performance of this duct.

To achieve optimal performance, cowlings, scoops or intake hoods 46 are provided on the lateral, exterior surface of the duct 40 in several embodiments. In a preferred embodiment, the intake hoods 46 are not located on the top/dorsal or bottom/ventral exterior surface of the duct 40, but rather optimally on the lateral surface in order to maintain a low vertical profile for relatively shallow environments, or environments where it is desirable to avoid impinging upon surface and shallow sub-surface traffic. In a particular such embodiment, there are two hoods 46, one on each lateral surface of the duct 40. Each hood 46 includes an front opening at the upstream or intake end of the duct 40, enclosed lateral sides, and a top panel which converges gradually towards the slope of the duct 40 such that at the aft or outlet end of the duct 40 the top panel of the hood 46 abuts and is contiguous with the exterior surface of the duct 40. There is a cut-out or vent 48 in the side wall of the duct 40 which is optimally substantially similar in area to the top panel of the hood 46. The advantage of these vents 48 is that they provide additional flow control without increasing the overall size of the duct 40 as depicted in FIGS. 13-17. The relative sizes or ratio of areas of the intake hood 46 opening or top panel to the vent 48 opening may vary in specific embodiments, and may be adapted to any suitable size such as may be selected based on one or more of: the fluid flow speed, turbine blade size, diffuser duct 40 dimensions and turbine inlet 42 or outlet 44 size, as may be advantageous for a particular application or the requirements of a particular turbine site, for example. In one embodiment, techniques such as computational fluid dynamic methods may be used to determine suitable sizes and/or ratio of areas of intake hood 46 opening or top panels, and vents 48, for example.

In a preferred embodiment, aft diffusion cut-outs 50 are provided at the upper and lower also referred to as the top and bottom portions of the duct 40, at the aft edge, as depicted in FIGS. 18-22. A portion of the aft duct 40 edge therefore in effect deviates towards the fore area of the duct 40. The cut-outs 50 reduce losses due to turbulence or non-laminar flow immediately aft of the rear diffuser 40 edge, which in a preferred embodiment is the substantially straight section of the oblong duct 40. The cut-outs 50 therefore effect improved flow diffusion, reduced wake and increased power from the turbine (FIGS. 18-22). In a particular embodiment, cut-outs 50 may be adapted to be suitably sized such that the cut-outs 50 reduce the flat section of the oblong duct 40 as much as possible with a continuous contour defining the shape of the cut-out 50, without unduly compromising the structural integrity of the diffuser duct 40.

Also in a preferred embodiment, an inlet flow enhancement feature 54 or hydrodynamic profile of the duct 40 face is provided as depicted in FIGS. 23-27. This feature provides a lower edge of the inlet 42 which protrudes in front of, or forward of the upper edge of the duct 40. The protruding lower edge of the duct 40 or oblique face 54 improves the flow in the turbine and increases the overall efficiency. The oblique face 54 enhances the fluid flow through the turbine 10 by approximating it to a uniform flow. The oblique face 54 or shovel mouth also allows the flow to enter the turbine 10 gradually and thus reduce the tendency of the flow to be diverted around the turbine 10.

Figure 28:
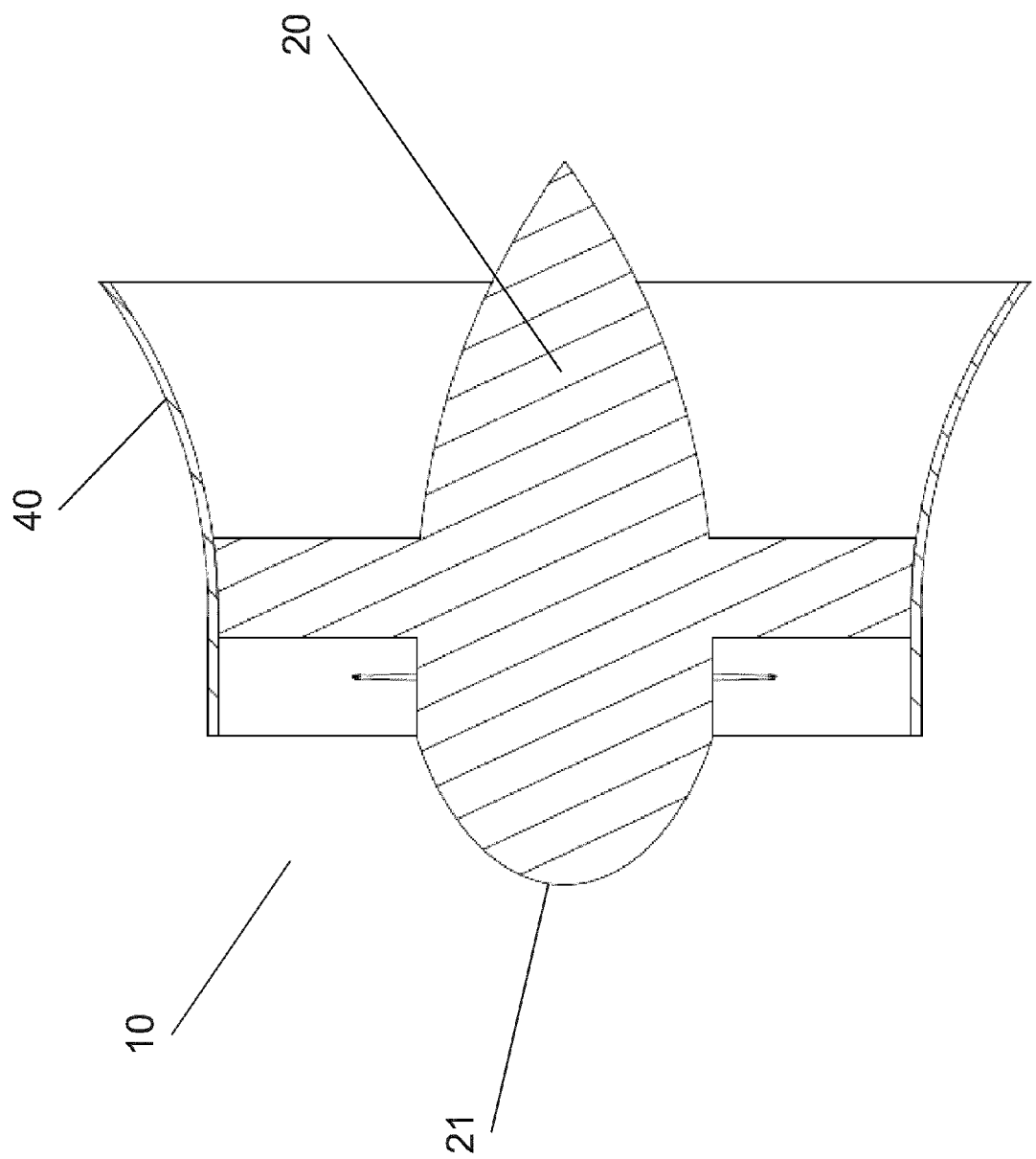
FIG. 28 is a plan cross section view of a single turbine generator unit with a solid hub in a ducted unidirectional turbine according to the invention.

In a variation in order to provide for a smaller bearing configuration, the hub 20 may not have a longitudinal hole, as depicted in FIG. 28.

In a preferred embodiment, the hub 20 includes a longitudinal hole therethrough, and two or more turbine blades 60 attached to the hub 20, as depicted in FIG. 29.

Figure 30:
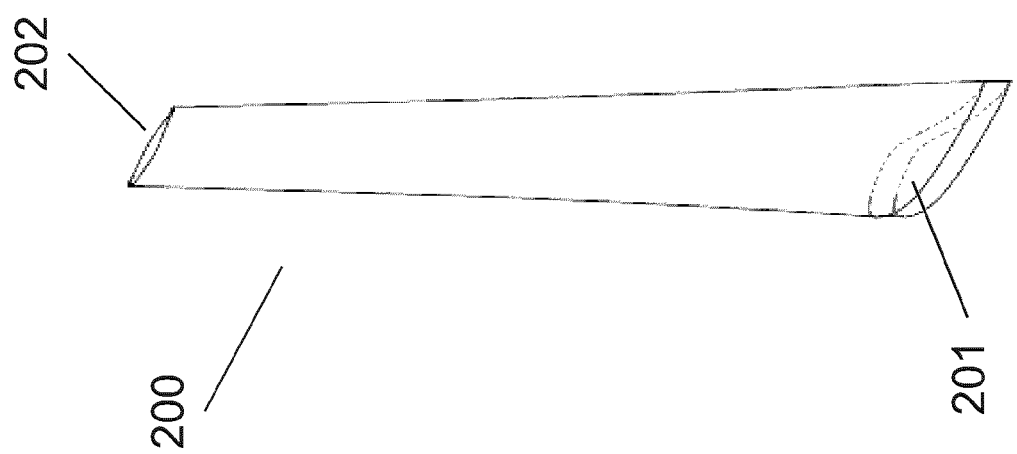
FIG. 30 is a perspective view of a cambered hydro turbine blade according to an embodiment of the present invention.

Referring to FIG. 30, a perspective view of a cambered hydro turbine blade 200 according to an embodiment of the present invention is shown. Hydro turbine blade 200 comprises blade root section 201 located proximal to a hub of a hydro turbine according to an embodiment of the present invention, and adapted for attachment to such hub (not shown). A hydro turbine according to the present invention may in one embodiment comprise between two and six or more turbine blades 200 which may be attached to a hub of the hydro turbine (not shown) to form a turbine rotor. In one embodiment the hydro turbine rotor may comprise three or five turbine blades 200.

Exemplary turbine blade 200 further comprises a tip section 202 distal from the root section 201. In one embodiment, turbine blade 200 may incorporate a twist along the span of blade 200 extending radially outward between the root section 201 and tip section 202. In one embodiment, such radial or spanwise twist may be determined according to suitability for application in a particular underwater fluid flow environment, such as river or ocean flow, taking into account such factors as fluid flow characteristics which may include average velocity, velocity variation, turbulence, etc.

Turbine blade 200 also comprises a hydrodynamic profile such as the hydrodynamic profile shown at blade root 201 so as to generate lift from fluid (such as a river and/or ocean water current for example) flowing past the blade. In one embodiment, such hydrodynamic profile of blade 200 may comprise a cambered profile which is asymmetrical about the chord of the profile. In such embodiments, any suitable such cambered profile such as those known in the art may be utilized in turbine blade 200. In particular, a suitable cambered blade profile may be selected from such known cambered profiles as may be suitable for a particular application of the hydro turbine, such as may be determined according to fluid flow conditions prevalent for a particular application, for example.

Figure 31:
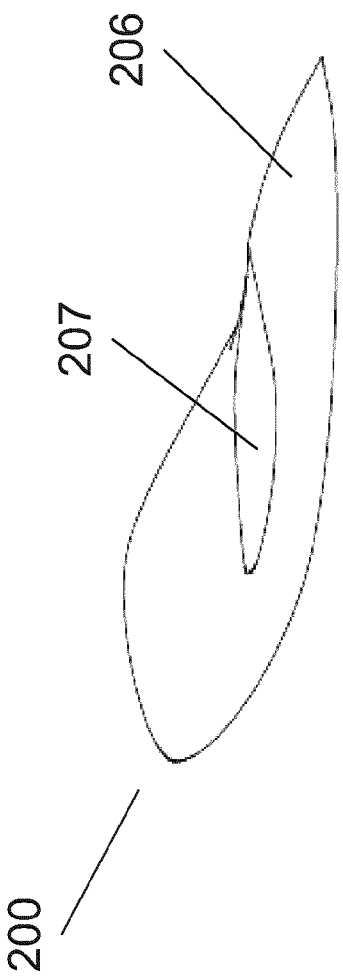
FIG. 31 is a plan view of the exemplary hydro turbine blade shown in FIG. 30 according to an embodiment of the invention.

Referring to FIG. 31, a plan view of the exemplary hydro turbine blade 200 shown in FIG. 30 is shown, according to an embodiment of the invention. In FIG. 31, the cambered hydrodynamic profile of blade 200 is clearly visible in the profile outline of blade root section 206 and blade tip section 207 viewed in plan view. As described above, in exemplary turbine blade 200, the blade profile comprises a radial or spanwise twist extending radially between blade root section 206 which is proximal to and attachable to a hub of a hydro turbine according to the present invention, and blade tip section 207 which is radially distal from such root section 206, as may be more clearly seen in FIG. 31.

Figure 32:
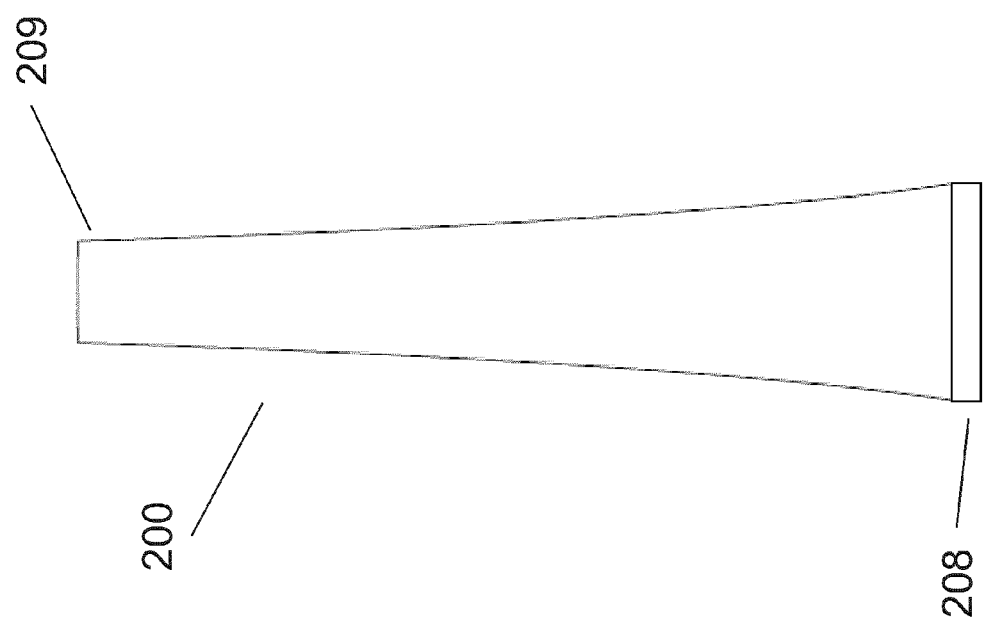
FIG. 32 is a rear view of the exemplary hydro turbine blade shown in FIG. 30 according to an embodiment of the invention.

Referring to FIG. 32, a rear elevation view of the exemplary hydro turbine blade 200 shown in FIG. 30 is shown, according to an embodiment of the invention. As shown in FIG. 32, in one embodiment, hydro turbine blade 200 may also comprise a spanwise or radial taper, extending between turbine blade root section 208 and tip section 209. In such an embodiment, and as illustrated in FIG. 32, turbine blade 200 may desirably be of greater chord dimension (e.g. wider in chord) at turbine blade root section 208 which may be located proximal to and attachable to a hub of the hydro turbine, than at turbine tip section 209 (narrower in chord) radially distal from blade root 208.

Figure 33:
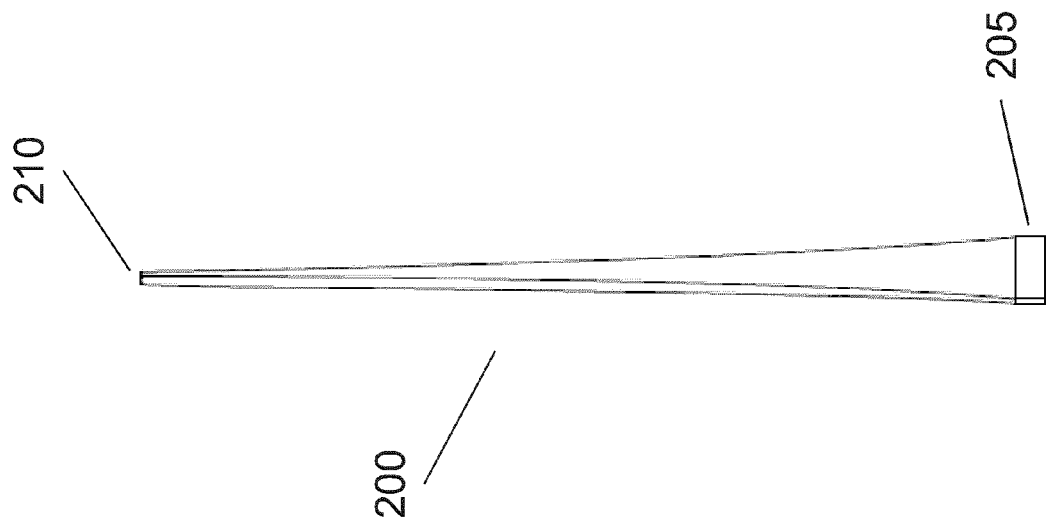
FIG. 33 is a side elevation view of the exemplary hydro turbine blade shown in FIG. 30 according to an embodiment of the invention.

Referring to FIG. 33, a side view of the exemplary hydro turbine blade 200 shown in FIG. 30 is shown, according to an embodiment of the invention. As shown in FIG. 33, hydro turbine blade 200 may further also comprise a spanwise or radial taper in profile thickness between turbine blade root section 205 and tip section 210. In such an embodiment as illustrated in FIG. 33, the thickness of the hydrodynamic profile of turbine blade 200 is thicker at blade root section 205 which is located proximal to and attachable to the hub of a hydro turbine according to an embodiment of the present invention, than at the blade tip section 210, which has a relatively lesser hydrodynamic profile thickness.

Referring to FIG. 34, a perspective view of a hydro turbine blade 211 with a raked tip section 218 is shown, according to an embodiment of the present invention. Hydro turbine blade 211 comprises blade root section 219 which is adapted to be located proximal to a hub of a hydro turbine according to an embodiment of the present invention, and adapted for attachment to such hub (not shown) to form a turbine rotor, such as an exemplary turbine rotor comprising between two and six or more turbine blades 211, for example. In one embodiment the hydro turbine rotor may comprise three or five turbine blades 211.

Exemplary turbine blade 211 further comprises a raked tip section 218 distal from the root section 219. Raked blade tip section 218 comprises at least a portion of the distal length of the blade 211 including the extreme tip of the blade 211. In one embodiment, raked blade tip section 218 is oriented at a dihedral angle relative to the remaining majority of the length of the turbine blade 211. In a particular embodiment, such dihedral angle separating raked blade tip section 218 from turbine blade 211 may be between about two to forty degrees, for example.

Optionally, turbine blade 211 may incorporate a twist along the span of blade 211 extending radially outward between the root section 219 and raked tip section 218. Similar to as described above, in one embodiment, such radial or spanwise twist may be determined according to suitability for application in a particular underwater fluid flow environment, such as river or ocean flow, taking into account such factors as fluid flow characteristics which may include average velocity, velocity variation, turbulence, etc. Also similar to as described above, turbine blade 211 also comprises a hydrodynamic profile such as the hydrodynamic profile shown at blade root 219 so as to generate lift from fluid (such as a river and/or ocean water current for example) flowing past the blade. In one embodiment, such hydrodynamic profile of blade 219 may comprise a cambered profile which is asymmetrical about the chord of the profile. In such embodiments, any suitable such cambered profile such as those known in the art may be utilized in turbine blade 219, such as may be selected according to fluid flow conditions prevalent for a particular application, for example.

Referring to FIG. 35, a plan view of the exemplary hydro turbine blade 211 shown in FIG. 34 is shown, according to an embodiment of the invention. In FIG. 35, the cambered hydrodynamic profile of blade 211 may be seen in the profile outline of blade root section 215 and raked blade tip section 214 viewed in cross-section. As described above, in an optional embodiment, the blade profile of turbine blade 211 may optionally comprise a radial or spanwise twist extending radially between blade root section 215 which is proximal to and attachable to a hub of a hydro turbine according to the present invention, and raked blade tip section 214 which is radially distal from such root section 215, and is aligned at a dihedral or rake angle relative to the main portion of the turbine blade 211, as may be seen in FIG. 35.

Referring to FIG. 36, a front view of the exemplary hydro turbine blade 211 shown in FIG. 34 is shown, according to an embodiment of the invention. As shown in FIG. 36, in one embodiment, hydro turbine blade 211 may also comprise a spanwise or radial taper, extending between turbine blade root section 217 and tip section 216. In such an embodiment, and as illustrated in FIG. 32, turbine blade 211 may desirably be of greater chord dimension (e.g. wider in chord) at turbine blade root section 217 which may be located proximal to and attachable to a hub of the hydro turbine, than at turbine tip section 216 (narrower in chord) radially distal from blade root 217. Further, in an optional embodiment, blade tip section 216 may also be biased or raked towards either the leading or trailing edge of the blade 211, resulting in a forward raked or rearward raked blade 211, respectively. In one such embodiment, as shown in FIG. 36, the raked blade tip section 216 may be situated at a dihedral angle relative to the blade 211 (e.g. with an upward rake), and may further also be raked or biased towards the leading edge of the turbine blade 211 (e.g. with a forward rake), and may therefore be referred to as a doubly raked turbine blade 211 having both upward and forward raked tip section 216, for example. In one embodiment of the present invention, doubly raked turbine blade 211 may desirably modify the radial flow distribution of fluid along the turbine blade 211, such as to improve the performance and/or efficiency of the turbine blade 211 in a hydro turbine generator according to an embodiment of the invention.

Referring to FIG. 37, a side elevation view of the exemplary hydro turbine blade 211 shown in FIG. 34 is shown, according to an embodiment of the invention. As shown in FIG. 37 and similar to as described above, hydro turbine blade 211 may further also comprise a spanwise or radial taper in profile thickness between turbine blade root section 213 and raked tip section 212. In such an embodiment as illustrated in FIG. 37, the thickness of the hydrodynamic profile of turbine blade 211 is thicker at blade root section 213 which is located proximal to and attachable to the hub of a hydro turbine according to an embodiment of the present invention, than at the blade tip section 212, which has a relatively lesser hydrodynamic profile thickness.

Figure 38:
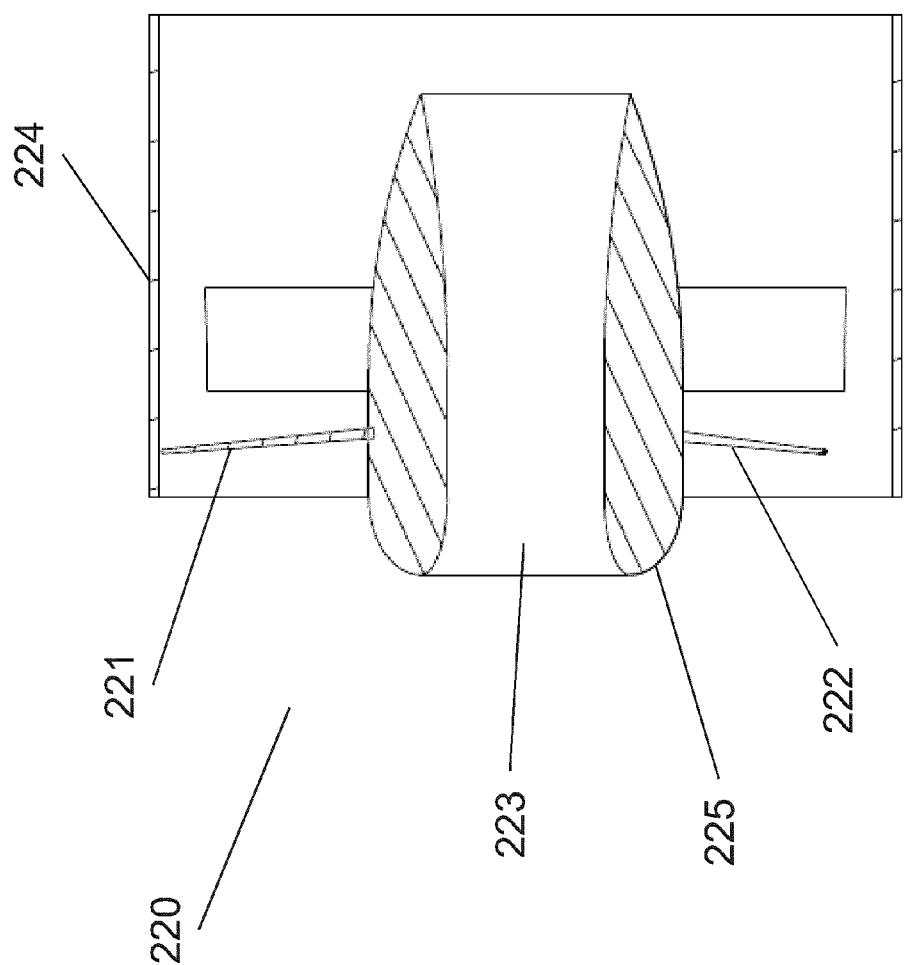
FIG. 38 is a cross-sectional view of a hydro turbine generator comprising forward raked blades, according to an embodiment of the present invention.

Referring to FIG. 38, a cross-sectional view of a hydro turbine generator 220 comprising forward raked blades 221, 222 is shown, according to an embodiment of the present invention. The hydro turbine generator 220 comprises an outer duct or housing 224, and an inner hub 225 which comprises a central hole 223 extending axially through the hub 225, such as to allow passage of fluid and/or marine life through the hub 225. As can be seen in FIG. 38, turbine blades 221 and 222 are attached at their root ends to hub 225, so as to provide a multi-bladed hydro turbine rotor. Further, in the embodiment shown in FIG. 38, turbine blades 221 and 222 are attached to turbine hub 225 inclined at a forward rake angle toward the front or upstream side of the turbine 220, that is, towards the upstream end of the turbine hub 225. In such an embodiment, the forward rake angle of the turbine blades 221 and 222 at their attachment to the turbine hub 225 may desirably act to modify the radial flow distribution of fluid along the turbine blades 221 and 222 during use of the turbine 220 in a submerged fluid flow environment, such as to improve the performance and/or efficiency of the turbine blades 221 and 222 in hydro turbine 220.

Referring to FIG. 39, a perspective view of a cambered hydro turbine blade 230 comprising multiply beaded surface features 233, 234 is shown, according to an embodiment of the present invention. Hydro turbine blade 230 comprises blade root section 232 which is adapted to be located proximal to a hub of a hydro turbine according to an embodiment of the present invention, and adapted for attachment to such hub (not shown) to form a turbine rotor, such as an exemplary turbine rotor comprising between two and six or more turbine blades 230, for example. Similar to as described above in other examples, in one embodiment the hydro turbine rotor may comprise three or five turbine blades 230.

Exemplary turbine blade 230 further comprises a tip section 231 located distal from the root section 232 at the furthest radial extent of the blade 230. Optionally, turbine blade 230 may incorporate a twist along the span of blade 230 extending radially outward between the root section 232 and tip section 231. Similar to as described above, in one embodiment, such radial or spanwise twist may be determined according to suitability for application in a particular underwater fluid flow environment, such as river or ocean flow, taking into account such factors as fluid flow characteristics which may include average velocity, velocity variation, turbulence, etc.

Turbine blade 230 also comprises a hydrodynamic profile such as the hydrodynamic profile shown in outline at blade root 232 so as to generate lift from fluid (such as a river and/or ocean water current for example) flowing past the blade. As illustrated in FIG. 39, in one embodiment, such hydrodynamic profile of blade 230 may comprise a cambered profile which is asymmetrical about the chord of the profile. Further, in one embodiment, the hydrodynamic profile of the turbine blade 230 may desirably comprise two or more beaded surface features such as 233 and 234. Preferably, such multiple beaded surface features 233 and 234 may be located along the low pressure or suction side of the hydrodynamic profile, with at least one beaded feature 233 located towards the upstream or leading edge of the hydrodynamic profile, and at least one beaded feature 234 located relatively downstream or towards the trailing edge of the hydrodynamic profile, relative to the first feature 233. In such a manner, the multiple beaded surface features 233 and 234 of the exemplary beaded turbine blade 230 may desirably provide for improved reattachment of a substantially laminar fluid flow boundary condition to the low pressure or suction side of the blade during operation, so as to maintain a low pressure condition adjacent the blade 230 for a greater distance downstream along the chord of the turbine blade 230, for example. In another embodiment, the multiple beaded surface features 233 and 234 may desirably also provide for reduced turbulence in the fluid flow stream adjacent to the low pressure or suction side of the blade 230, such as to desirably maintain a relatively high pressure fluid flow on the opposite or high-pressure side of the blade 230, and thereby to improve lift and/or reduce drag characteristics of the turbine blade 230 in use in a flowing fluid environment. In one such embodiment, multiple beaded blade surface features 233 and 234 may comprise rounded convex curves or protrusions from the low-pressure or suction side of the blade profile, as shown in FIG. 39, and may further desirably extend along substantially the entire span of the turbine blade 230 from the root section 232 towards the tip section 231. In another embodiment, the multiple beaded blade surface features 233 and 234 may extend only part of the way along the span of the turbine blade 230 towards the tip section 231. In an optional embodiment, the number of beaded blade surface features such as features 233 and 234 may comprise any plural number of beaded features, such as may be desirable for improving performance of the turbine blade 230 in a particular operating environment, for example. In yet a further embodiment, turbine blade 230 may comprise multiple beaded surface features located on the high pressure side of the blade 230, such as with at least one beaded feature located towards the upstream or leading edge of the hydrodynamic profile on the pressure side of the blade 230, and at least one beaded feature located relatively downstream or towards the trailing edge of the hydrodynamic profile, relative to the first feature. In an optional embodiment, such beaded surface features may be located on the pressure side of turbine blade 230 only, or according to another optional embodiment, turbine blade 230 may comprise multiple beaded surface features on both high pressure and low pressure sides of blade 230.

Referring to FIG. 40, a plan view of the exemplary multiple beaded hydro turbine blade 230 shown in FIG. 39 is shown, according to an embodiment of the invention. In FIG. 40, the cambered hydrodynamic profile of blade 230 comprising exemplary multiple beaded surface features 237 and 238, may be seen in the profile outline of blade root section 236 and blade tip section 235 as viewed in plan view. Similar to as described above, in an optional embodiment, the blade profile of turbine blade 230 may optionally comprise a radial or spanwise twist extending radially between blade root section 236 which is proximal to and attachable to a hub of a hydro turbine according to the present invention, and blade tip section 235 which is radially distal from such root section 236. In another embodiment, the multiple beaded surface features 237 and 238 of blade 230 may desirably extend along substantially the entire span of the turbine blade 230, from the root section 236 towards the tip section 235.

Figure 41:
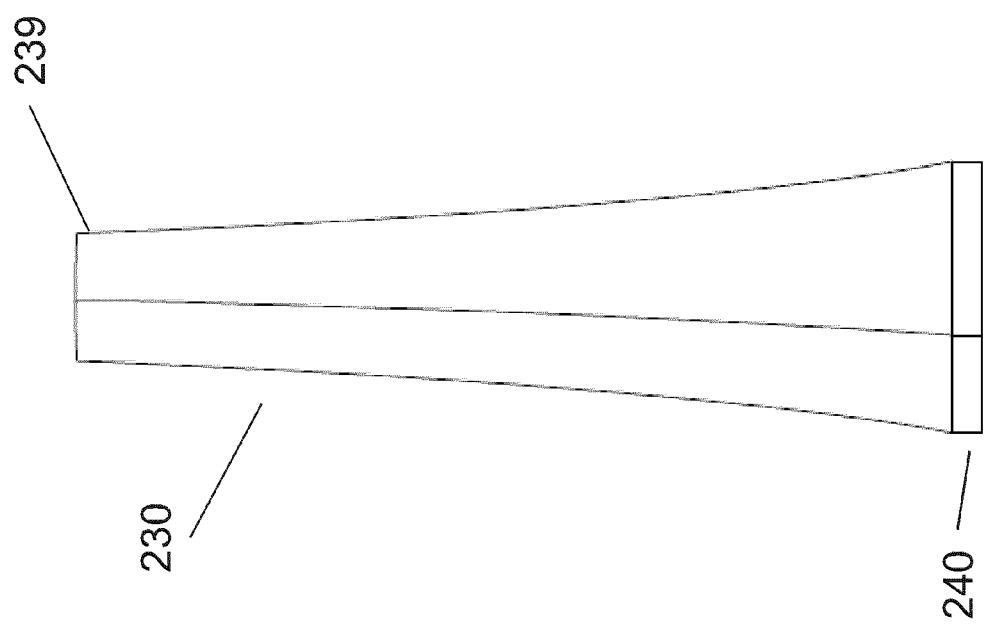
FIG. 41 is a rear view of the exemplary hydro turbine blade shown in FIG. 39 according to an embodiment of the invention.

Referring now to FIG. 41, a rear view of the exemplary hydro turbine blade 230 shown in FIG. 39 is shown, according to an embodiment of the invention. As shown in FIG. 41, in one embodiment, hydro turbine blade 230 may also comprise a spanwise or radial taper, extending between turbine blade root section 240 and tip section 239. In such an embodiment, and as illustrated in FIG. 41, turbine blade 230 may desirably be of greater chord dimension (e.g. wider in chord) at turbine blade root section 240 which may be located proximal to and attachable to a hub of the hydro turbine, than at turbine tip section 239 (narrower in chord) radially distal from blade root 240.

Figure 42:
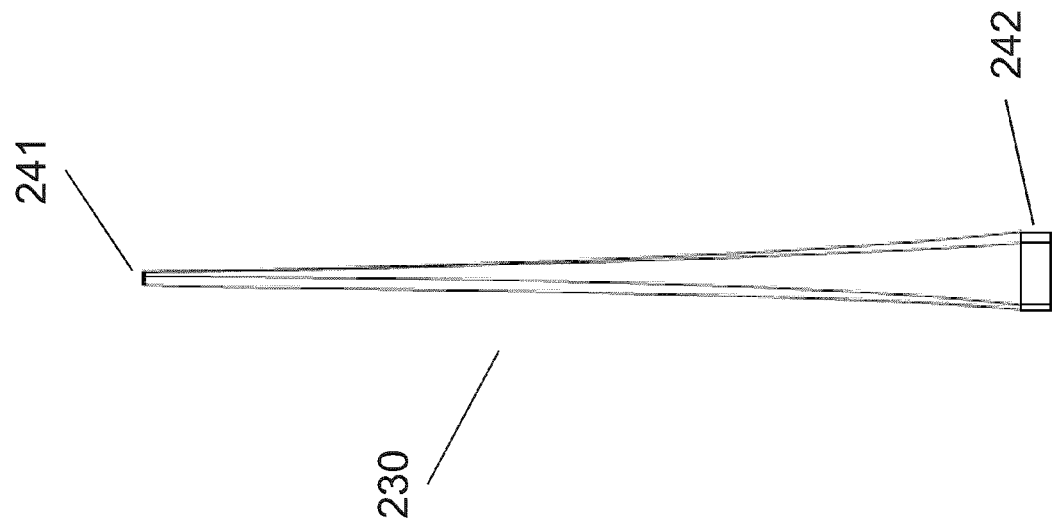
FIG. 42 is a side view of the exemplary hydro turbine blade shown in FIG. 39 according to an embodiment of the invention.

Referring now to FIG. 42, a side elevation view of the exemplary hydro turbine blade 230 shown in FIG. 39 is shown, according to an embodiment of the invention. As shown in FIG. 42 and similar to as described above, hydro turbine blade 230 may further also comprise a spanwise or radial taper in profile thickness between turbine blade root section 242 and tip section 241. In such an embodiment as illustrated in FIG. 42, the thickness of the hydrodynamic profile of turbine blade 230 is relatively thicker at blade root section 242 which is located proximal to and attachable to the hub of a hydro turbine according to an embodiment of the present invention, than at the blade tip section 241, which has a relatively lesser hydrodynamic profile thickness.

FIG. 43 shows a rear view of an exemplary hydro turbine blade 250 comprising a tapered tip 253, according to an embodiment of the present invention. The taper of the turbine blade 250 at the blade tip 253 is preferably more pronounced and more localized to the immediate area of the blade tip 253 than the optional gradual spanwise radial taper in the chord length of the blade 250 between the root section 254 and the tip section as is described above in reference to other embodiments. In particular, the localized tapered tip 253 of turbine blade 250 may desirably act to reduce the intensity of tip vortices in a fluid flowing past the tips of the turbine blade 250 during submerged use of the turbine in a flowing fluid environment. Such a reduction in tip vortices produced in the flowing fluid may desirably provide an improvement in the efficiency of the turbine blade 250, such as by reducing the drag experienced by the blade 250 moving through the fluid, and may therefore desirably provide an improvement in the power which may be extracted by the turbine blade 250.

Figure 44:
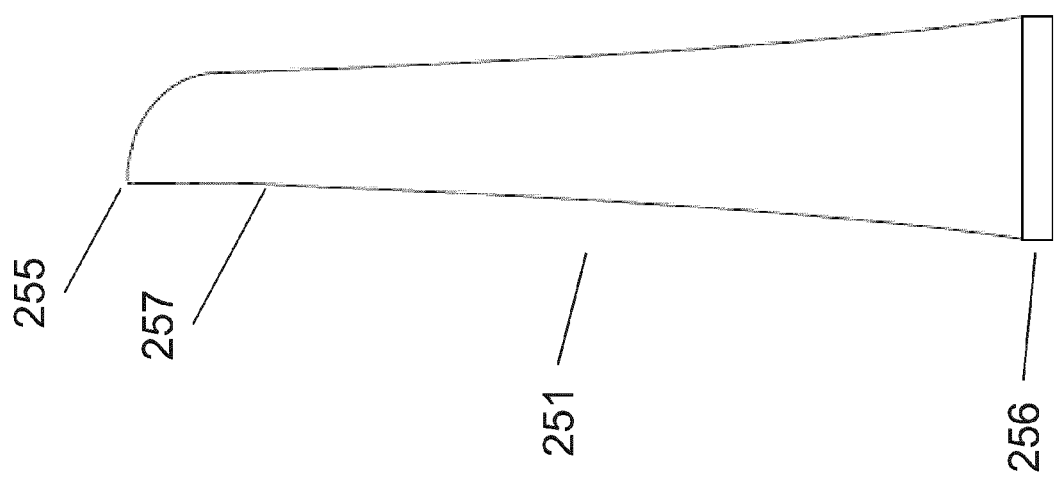
FIG. 44 is a rear view of an exemplary hydro turbine blade comprising a forward biased tip taper, according to an embodiment of the invention.

FIG. 44 shows a rear view of an exemplary hydro turbine blade 251 comprising a forward biased tip taper, according to an embodiment of the invention. The localized taper of the turbine blade 251 at the tapered blade tip 255 is biased towards the front or leading edge 257 of the blade 251, and meets the leading edge 257 of the turbine blade 251 at a substantially pointed angle. Similar to as described above in FIG. 43, the taper of the turbine blade 251 at the blade tip 255 is preferably more pronounced and more localized to the immediate area of the blade tip 255 than the optional gradual spanwise radial taper in the chord length of the blade 251 between the root section 256 and the tip section 255. Also similar to as described above, the localized forward biased tapered tip 255 of turbine blade 251 may desirably act to reduce the intensity of tip vortices in a fluid flowing past the tips of the turbine blade 251.

Figure 45:
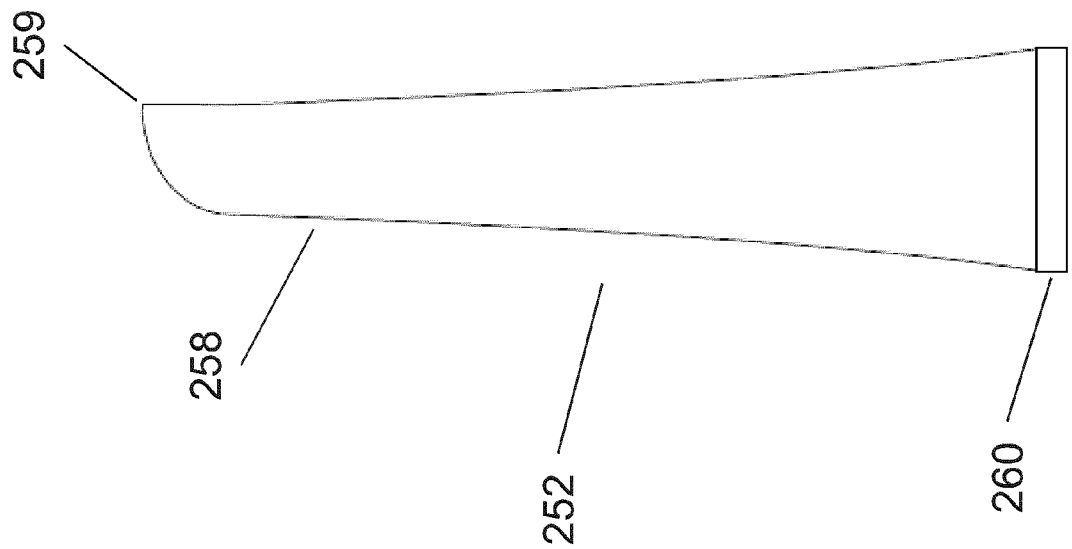
FIG. 45 is a rear view of an exemplary hydro turbine blade comprising a rearward biased tip taper, according to an embodiment of the invention.

FIG. 45 shows a rear view of an exemplary hydro turbine blade 252 comprising a rearward biased tip taper, according to an embodiment of the invention. The localized taper of the turbine blade 252 at the tapered blade tip 259 is biased towards the rear or trailing edge of the blade 252, which is opposite the leading edge 258. Accordingly, the rearward biased tapered tip 259 meets the trailing edge of the turbine blade 252 at a substantially pointed angle. Similar to as described above in FIGS. 43 and 44, the taper of the turbine blade 252 at the blade tip 259 is preferably more pronounced and more localized to the immediate area of the blade tip 259 than the optional gradual spanwise radial taper in the chord length of the blade 252 between the root section 260 and the tip section 259. Also similar to as described above, the localized rearward biased tapered tip 259 of turbine blade 252 may desirably act to reduce the intensity of tip vortices in a fluid flowing past the tips of the turbine blade 252.

Figure 46:
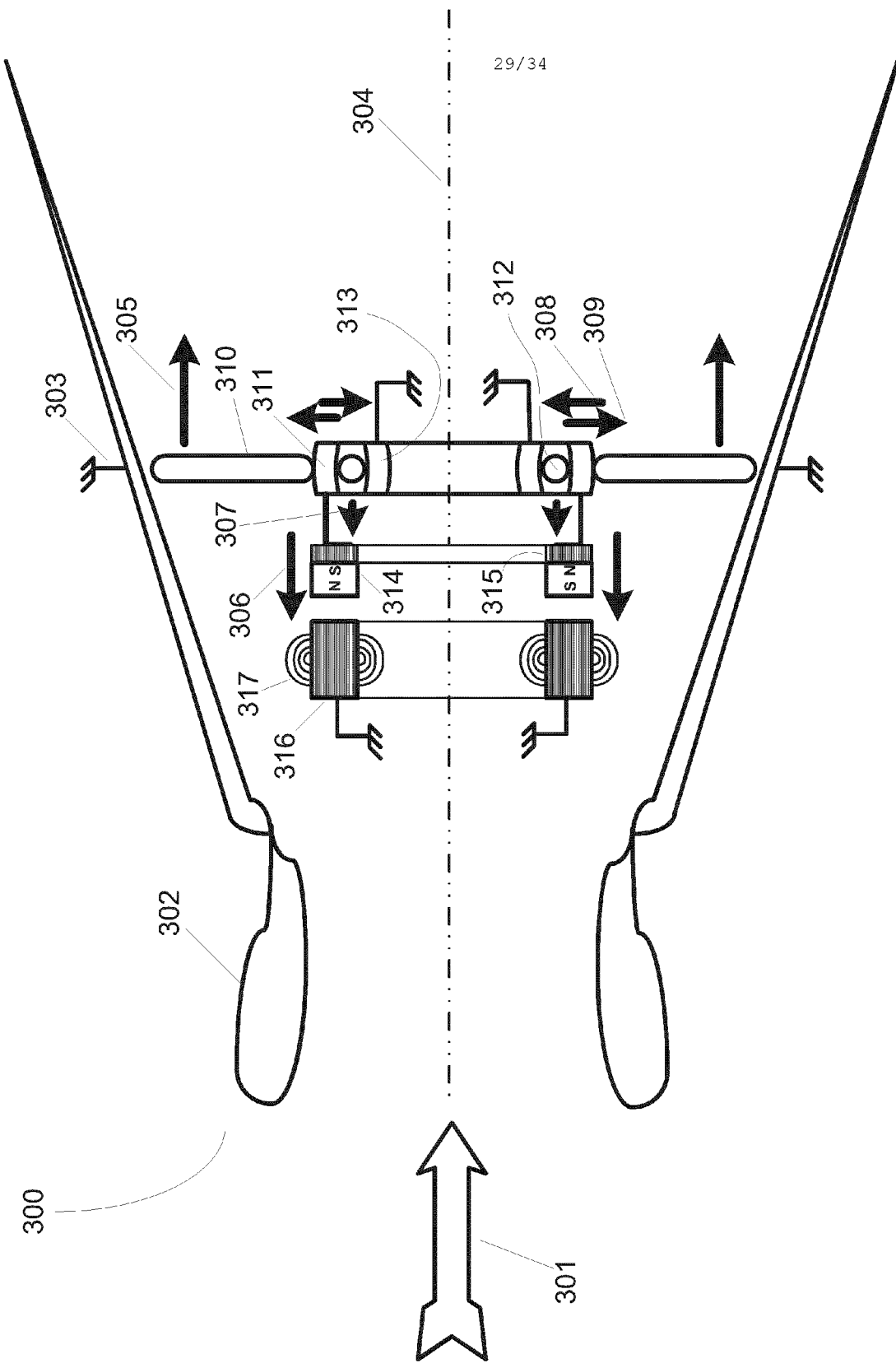
FIG. 46 is a cross-sectional schematic view of a hydro turbine generator with a magnetic generator and bearing, according to an embodiment of the present invention.

Referring now to FIG. 46, a cross-sectional schematic view of a hydro turbine generator 300 with a magnetic generator and bearing is shown, according to an embodiment of the present invention. Hydro turbine generator 300 comprises a single-sided axial-flux permanent magnet electrical generator, and comprises an outer housing or diffuser duct 302 which directs unidirectional fluid flow 301 through the turbine generator 300 and past turbine blades 310. Turbine blades 310 are attached to a turbine rotor structure which also comprises an outer bearing race 311 and a plurality of rotor permanent magnets 314 which are preferably substantially evenly spaced around the circumference of the turbine rotor. Rotor permanent magnets 314 are connected to a rotor back-iron 315 which serves to close magnetic field lines between sequential rotor permanent magnets 314. The turbine rotor structure is rotatably attached to an outer bearing race 311 of the central turbine hub structure by means of central antifriction bearing 312, and is rotatable around central axis 304. The central turbine hub structure also comprises a plurality of laminated iron stator armatures 316 which are preferably substantially evenly spaced around the circumference of the turbine hub. Stator armatures 316 each comprise a stator generator winding 317 which is preferably substantially accommodated within the stator armature 316. The turbine hub structure including the stator armatures 316 and stationary inner bearing race 313 are connected mechanically to the outer housing or diffuser duct 302 by means of any suitable mechanical attachment 303. In one embodiment, turbine blades 310 may comprise any suitable blade design for use in a unidirectional fluid flow turbine, such as but not limited to the turbine blades described above. In another embodiment, diffuser duct 302 may comprise any suitable duct or housing design for use in a unidirectional fluid flow turbine, such as but not limited to the duct designs described in detail above. Further, in one embodiment, rotor back-iron 315 may comprise a laminated or cast back-iron assembly, such as may be suitable to close magnetic field lines between rotor permanent magnets 314, for example.

In use submerged in a unidirectional fluid flow environment, the flow of fluid 301 through turbine generator 300 may rotate turbine blades 310 of the turbine rotor, which also rotates rotor permanent magnets 314 relative to stator armatures 316. Such rotational driving of the turbine blades 310 by fluid flow 301 results in axial blade thrust 305 which is exercised against the turbine blades 310 or the turbine rotor structure by the fluid flow against the blades, and is oriented in a downstream direction. The rotation of rotor permanent magnets 314 relative to stator armatures 316 and stator windings 317 induces an electromotive force within the stator windings 317 which desirably provides the means for converting mechanical power of the fluid flow 301 through the mechanical bearing system 311-312-313 within the single gap between rotor magnets 314 and stator armatures 316, and subsequently may be used for electrical generation at the stator windings to generate electrical power which may be exported from the turbine generator 300 for use in powering electrical loads such as by connection to an electrical supply and distribution grid, for example. The turbine generator 300 may desirably be used in a submerged fluid environment where the gap between the rotor magnets 314 and stator armatures 316 in the electrical generator of the turbine 300 is flooded with the ambient fluid, such as with river or seawater in the case of river or marine environments, and therefore does not require potentially expensive and failure-prone sealing arrangements within the rotor/stator generator gap.

In one embodiment of the invention, as with substantially all rotating machinery, the unidirectional turbine generator 300 is subjected to various severe loads during rotational use in a submerged fluid flow environment. Forces and moments are adopted by the turbine rotor bearing assembly 311-312-313 and transferred to the turbine hub and/or support structures. The bearing assembly 311-312-313 may preferably be operated submersed in harsh aquatic or marine environments, and potentially for extended periods of time such as between maintenance or replacement intervals.

The bearing assembly 311-312-313 of the present invention as shown in the embodiment of FIG. 46 is the main supporting member contained within the turbine hub. Accordingly, the turbine rotor/hub bearing assembly 311-312-313 must be capable of accommodating the following combined loads: radial load 309 of the turbine rotor (weight of the rotor), which is balanced by radial force 308 exerted by the bearing assembly on the turbine rotor; axial thrust loads 305 generated by the turbine blades 310 and electromagnetic fields; as well as potentially transient torsional loads and tilting moments. The bearing assembly 311-312-313 must also desirably operate in vibratory environment, where rotating and linear accelerations and oscillations are present such as due to variations and/or turbulence in the fluid flow 301 passing through the turbine generator 300. Moreover, the bearing assembly 311-312-313 selection and arrangement for turbine generator 300 is preferably governed by the objective of reducing frictional torque, hence increasing the overall generation efficiency of the hydro turbine generator 300. Additionally, in one aspect of the invention, reliability and extended lifetime of the generator 300 and bearing assembly 311-312-313 are also important, such as to maintain system integrity until planned maintenance or replacement is completed.

In one embodiment of the present invention the turbine generator 300 desirably comprises a hybrid bearing assembly whereby at least a portion of the bearing function is provided by the turbine magnetic generator system. In one such arrangement the turbine generator incorporates a two component magnetic and anti-friction bearing. In an optional further embodiment, a third hydrodynamic bearing component may also be implemented in the turbine generator bearing system. Various combinations of bearing system components may also be contemplated in further embodiments, where two or more hybrid bearing system components may be coupled to produce a specific hybrid bearing assembly for handling some or all of the above-mentioned bearing load components. In yet a further embodiment, one bearing component may be primarily relied upon, and other bearing components may be incorporated to provide redundant and/or back up bearing functionality.

In one embodiment, the rotor permanent magnets 314 of the turbine generator 300 are functional both to induce electrical potential in the stator windings 317 of the turbine stator (or hub), and are also permanently magnetically attracted to the stator armatures 316, thereby providing a permanent axially oriented magnetic attractive force 306 which is directed in the upstream direction relative to the fluid flow 301, and which thereby serves to at least partially balance the downstream axial thrust force 305 exerted on turbine blades 310.

Accordingly, the bearing assembly 311-312-313 of the turbine generator 300 may desriably only have to bear a reduced portion of the turbine blade axial thrust force 305, and the bearing assembly may therefore exert only a reduced axial bearing force 307 to fully balance the magnitude of the axial thrust force 305 during turbine operation. Such reduction in the magnitude of the axial bearing force 307 exerted by the bearing assembly 311-312-313 in the present hybrid magnetic/anti-friction bearing configuration may desirably result in less friction and wear on the mechanical anti-friction bearing assembly 311-312-313, and may therefore provide improved efficiency, longevity and/or reliability of the bearing system. Also, the magnitude of the axial magnetic attractive bearing force 306 between the rotor magnets 314 and stator armatures 316 is relatively insensitive to changes in the rotational speed of the turbine rotor, the velocity of the fluid flow 301, and the external electrical load applied to the generator windings 317. In another embodiment, the magnitude of the axial magnetic attractive bearing force 306 may also desirably be substantially insensitive to the magnetic sequence or orientation of the poles (N-S or S-N, etc.) of the rotor magnets 314 in the turbine rotor.

In another embodiment, a two-component magnetic and anti-friction bearing system may comprise a radial-flux permanent magnet generator component and an anti-friction bearing component. In such an embodiment, the radially directed magnetic attractive force between the permanent magnet rotor of the radial flux generator may desirably serve to provide at least a portion of the radial bearing force supporting the radial weight of the turbine rotor. In such a configuration, the hybrid radial magnetic bearing and anti-friction bearing system may desirably minimize the radial size of the overall generator and hybrid bearing system assembly, such as may be desirable for use in environments where available water depth is limited and a minimized radial size of the generator/bearing assembly is hydrodynamically preferred.

In a further optional embodiment, a two-component magnetic and anti-friction bearing system may comprise an angular-flux permanent magnetic generator component, and an anti-friction bearing component. In such an embodiment, the angular-flux permanent magnet generator may be configured such that the plane between the permanent magnet rotor and stator elements of the generator is inclined at an acute angle to the longitudinal axis of the hydro turbine generator, such that the magnetic attractive force between the rotor and stator elements comprises both axially and radially directed components. Accordingly, such axial and radial magnetic attractive forces may desirably provide at least a portion of both axial and radial bearing forces supporting the turbine rotor against axial and radial loads. Additionally, in yet a further optional embodiment, the angle at which the angular-flux magnetic generator is situated relative to the longitudinal axis of the turbine generator may desirably be optimized such that the resultant axial magnetic attractive force of the generator may approximately balance the turbine blade axial thrust force. Such a configuration may therefore desirably reduce the friction and associated wear on the mechanical anti-friction bearing component in both the axial and radial directions, and may therefore desirably provide improved efficiency, longevity and/or reliability of the two-component magnetic and anti-friction bearing system.

Figure 47:
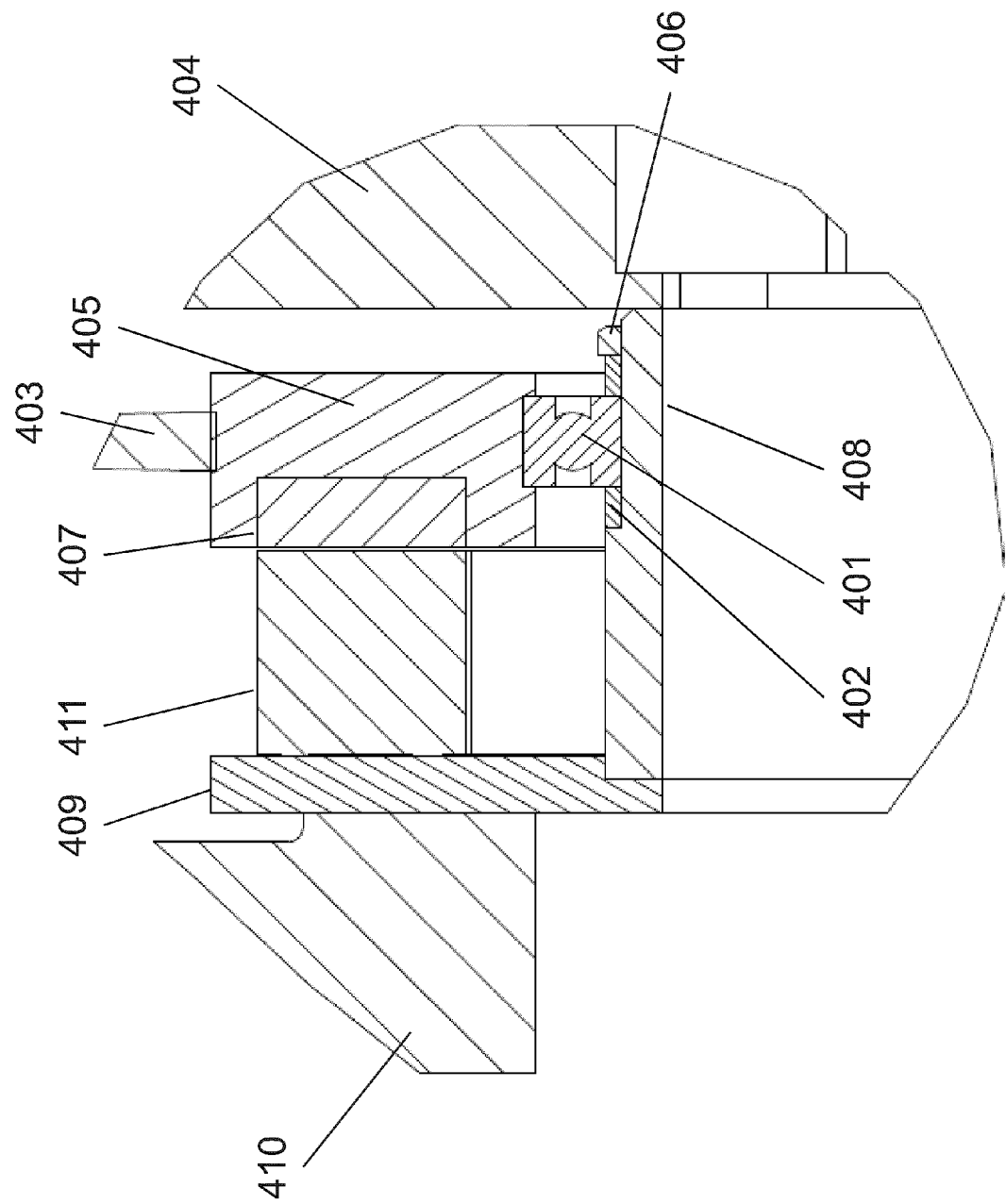
FIG. 47 is a cross-sectional view of a hydro turbine anti-friction bearing according to an optional embodiment of the invention.

Referring now to FIG. 47, a cross-sectional view of a hydro turbine anti-friction bearing assembly is shown according to an embodiment of the invention incorporating a magnetic and anti-friction hybrid bearing function. In such embodiment, anti-friction bearing 401 is mounted on a stationary shaft 408 located between the upstream portion of the turbine hub 410 and downstream turbine hub structure 404, and is suitably clamped or retained in place such as by retaining nut or bolt 406, and/or retaining rings 402, for example. The turbine generator stator core 411 comprises the stator armatures and windings, and is mounted on a substantially stiff stator plate 409 to provide a substantially rigid stator disc. The turbine rotor permanent magnet race 407 comprises the rotor permanent magnets, and is mounted within the turbine rotor (or turbine blade ring) 405 which bears against the anti-friction bearing 401. The anti-friction bearing 401 supports the full radial load from the weight of the turbine rotor 405 (which comprises the turbine blades 403 and rotor magnet 407 assemblies) and it also supports the remaining portion of the axial thrust load of the turbine blades 403 which is not compensated magnetically by the axial magnetic attractive force between the rotor magnets 407 and stator core 411.

In the situation when the turbine generator unit is not in operation, the anti-friction bearing 401 as shown in FIG. 47 is effectively pre-loaded axially by the axial magnetic attractive force between the turbine rotor magnets 407 and the turbine stator core (i.e. stator armatures) 411. Once the turbine generator begins to rotate due to the force of fluid flowing past the turbine blades 403, and during continuous in-stream rotational operation, the axial thrust force exerted against the turbine blades 403 effectively axially unloads the anti-friction bearing 401, reducing the axial balancing force required to be supported by the anti-friction bearing 401. This reduced loading of the anti-friction bearing 401 during operation in the hybrid magnetic/anti-friction bearing configuration of the embodiment shown in FIG. 47 may therefore advantageously result in less friction and wear on the anti-friction bearing 401, and may therefore desirably provide improved efficiency, longevity and/or reliability of the anti-friction bearing and ultimately of the hydro turbine generator.

In the embodiment shown in FIG. 47, the components of the anti-friction bearing 401, including bearing races, rolling/sliding bearing elements, bearing cages, etc., may be operated in a fully flooded condition, where they are inundated in the ambient fluid medium—i.e. fresh and/or sea water in the case of river and/or ocean applications. Accordingly, in such embodiments, the flooded anti-friction bearing 401 may desirably not require or use liquid seals such as to prevent entry of ambient water or other fluid, as such liquid seals may be expensive and/or prone to failure. Therefore, the anti-friction bearing 401 may be considered to operate un-lubricated in such flooded conditions. Accordingly, the presence and purpose of any seals which may be implemented in the anti-friction bearing 401 configuration is preferably limited to non-contacting type seals (such as but not limited to labyrinth seals or shields) which may be designed to "filter" fluid ingress into the bearings such as to reduce or prevent the ingress of debris into the anti-friction bearing 401, but not to prevent the flooding of the anti-friction bearing 401 with fluid. In one embodiment, any type of anti-friction bearing suitable for extended flooded use may be adopted as anti-friction bearing 401. In a particular embodiment, anti-friction bearing 401 may comprise a fully ceramic bearing, where all bearing components comprise ceramic materials, such as but not limited to $Si_3N_4$ for example. However, in other embodiments, other hybrid combinations of bearing materials such as ceramic balls with alloy and/or coated races may also be used for anti-friction bearing 401.

In a further optional embodiment, the mechanical gap between turbine rotor assembly 407 (comprising rotor permanent magnets) and the stator core 411 (comprising stator armatures) may desirably be suitably spaced and/or adjusted so that an additional hydrodynamic thrust force is created which is oriented in the direction of the axial thrust of the turbine blades. Such hydrodynamic thrust force may thereby desirably reduce the magnitude of any axial magnetic load, generated by the attraction of the rotor magnets, on the anti-friction bearing 401. In such and embodiment, the faces of the stator core and stator armatures 411 may be designed as hydrodynamic thrust pads and the turbine rotor surfaces of turbine rotor 405 and rotor magnet assembly 407 may be designed as hydrodynamic thrust washers of a hydrodynamic bearing. Further, in an optional embodiment, anti-friction bearing retaining rings 402 may be designed as spring members, thus allowing the anti-friction bearing 401 to displace axially along the bearing shaft 408 in response to bearing forces during operation. This axial displacement may dynamically alter the gap between rotor and stator members 407 and 411, thus providing for adjustment of the optional hydrodynamic bearing thrust capacity, and thereby allowing control of the loading of the anti-friction bearing 401.

Figure 48:
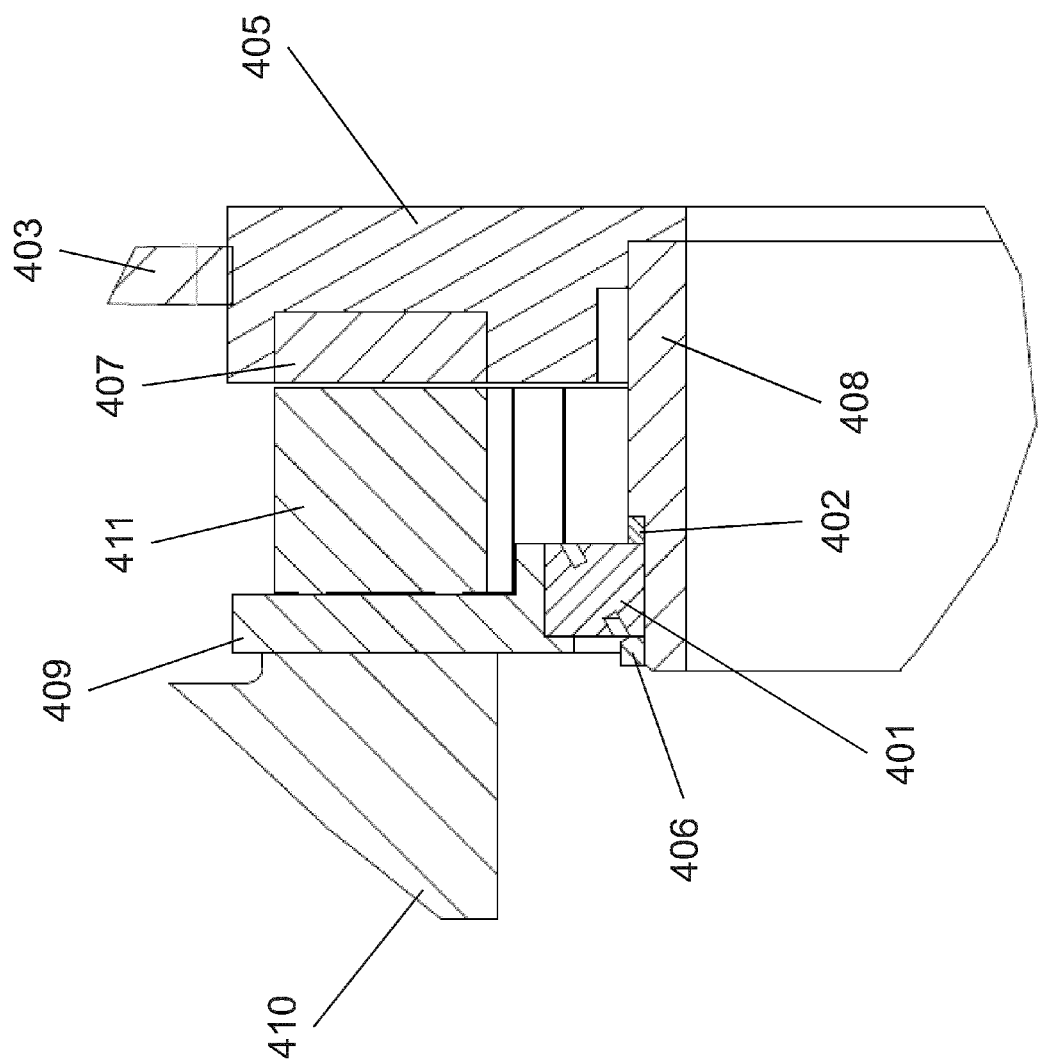
FIG. 48 is a cross-sectional view of a hydro turbine anti-friction bearing according to a further optional embodiment of the invention.

Referring now to FIG. 48, a cross-sectional view of a hydro turbine anti-friction bearing assembly according to a further optional embodiment of the invention is shown. The anti-friction bearing assembly shown in FIG. 48 represents an alternative configuration where the outer race of the bearing comprising stator core 411 and stator plate 409 is adapted to remain stationary, rather than the inner race of the bearing which is adapted to rotate and comprises turbine blades 403, magnet race 407, rotor 405, shaft 408 and retaining rings 402. All other components of the anti-friction bearing assembly as shown in FIG. 48 remain substantially as described above according to their reference numerals.

Figure 49:
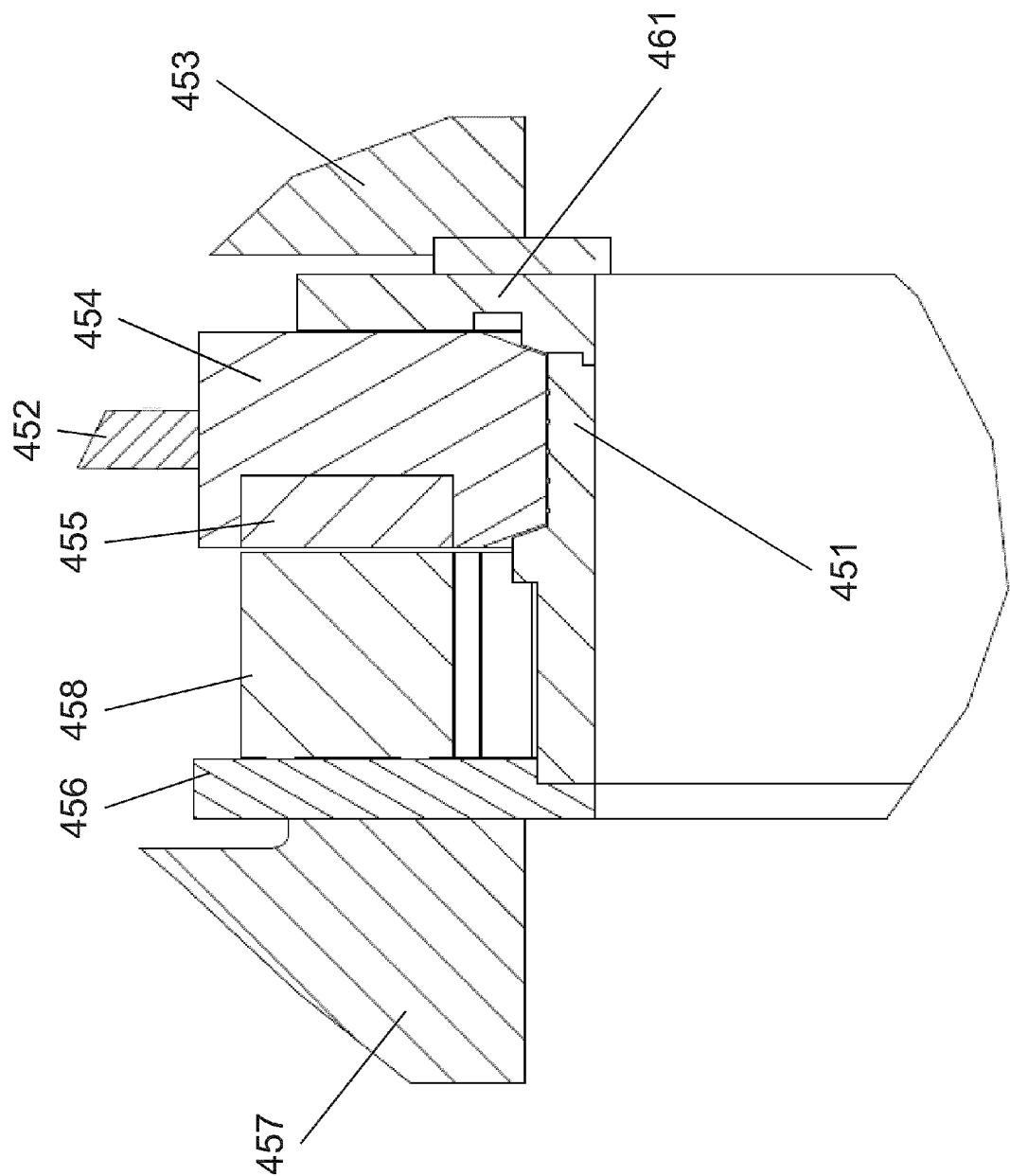
FIG. 49 is a cross-sectional view of a hydro turbine hydrodynamic bearing according to an optional embodiment of the present invention.

Referring to FIG. 49, a cross-sectional view of a hydro turbine hydrodynamic bearing according to an embodiment of the present invention is shown, incorporating a magnetic and anti-friction hybrid bearing function. In such embodiment, a suitable fluid film hydrodynamic bearing 451 is adapted in place of the anti-friction bearing of the previous similar embodiments. The hydrodynamic bearing 451 is mounted atop a stationary shaft located between the upstream portion of the turbine hub 457 and downstream turbine hub structure 453. In the present embodiment, the turbine generator stator core 458, comprising the stator armatures and windings, is mounted on a substantially stiff stator plate 456 to provide a substantially rigid stator disc. The turbine rotor permanent magnet race 455 comprises the rotor permanent magnets, and is mounted within the turbine rotor (or turbine blade ring) 454 which is attached to the turbine blades 452 and bears against the hydrodynamic bearing 451. The hydrodynamic bearing 451 supports the full radial load from the weight of the turbine rotor 454 (which comprises the turbine blades 452 and rotor magnet 455 assemblies) and it also supports the remaining portion of the axial thrust load of the turbine blades 452 which is not compensated magnetically by the axial magnetic attractive force between the rotor magnets 455 and stator core 458. The turbine rotor 454 is axially constrained on the upstream side by the stator core and armatures 458 which act as an axial thrust pad, and on the downstream side by a downstream thrust plate 461, which may be made of any suitable material, such as but not limited to anti-friction or reduced-friction materials, for example.

In the situation when the turbine generator unit is not in operation, the hydrodynamic bearing 451 as shown in FIG. 49 is effectively pre-loaded axially by the axial magnetic attractive force between the turbine rotor magnets 455 and the turbine stator core (i.e. stator armatures) 458. Once the turbine generator begins to rotate due to the force of fluid flowing past the turbine blades 452, and during continuous in-stream rotational operation, the axial thrust force exerted against the turbine blades 452 effectively axially unloads the hydrodynamic bearing 451, reducing the axial balancing force required to be supported by the hydrodynamic bearing 451. This reduced loading of the hydrodynamic bearing 451 during operation in the hybrid hydrodynamic/anti-friction bearing configuration of the embodiment shown in FIG. 49 may therefore advantageously result in less friction and wear on the hydrodynamic bearing surfaces, and the adjacent axial load plate and pad surfaces, and may therefore desirably provide improved efficiency, longevity and/or reliability of the hydrodynamic bearing and ultimately the hydro turbine generator.

In alternative embodiments, hydrodynamic bearing 451 may additionally comprise features such as thrust surfaces, hydrodynamic thrust pads, and/or hard stop surfaces, for example. Further, turbine rotor 454 may optionally be at least partially hollow or otherwise made buoyant such that any such buoyant force may desirably reduce the submerged weight of the rotor 454 and thereby reduce the radial force supported by hydrodynamic bearing 451.

Figure 50:
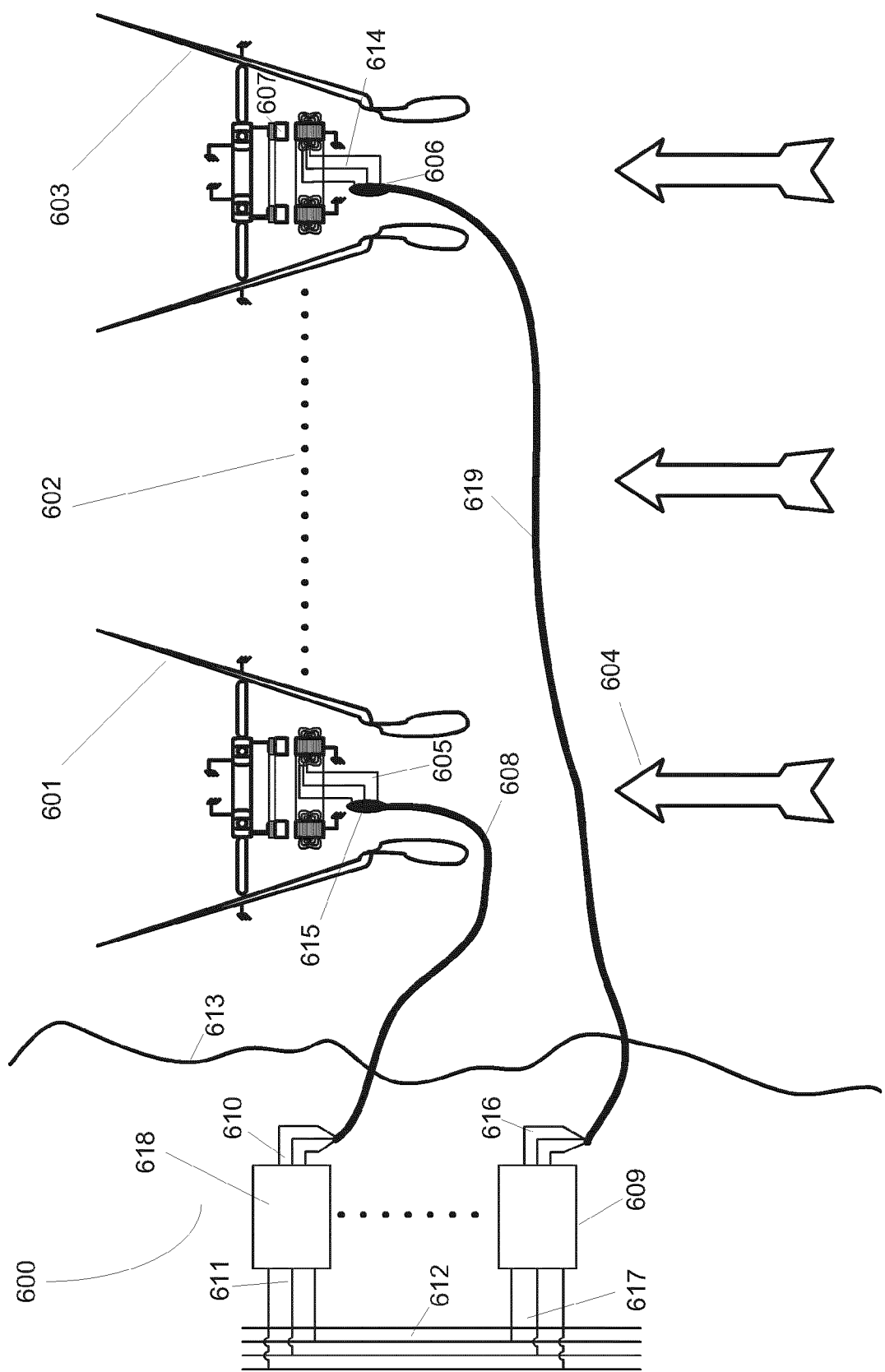
FIG. 50 is a schematic view of an in-stream hydro turbine generator farm 600 according to an embodiment of the invention.

Referring now to FIG. 50, a schematic representation of an exemplary in-stream hydro turbine generator farm 600 according to an embodiment of the invention is shown. Exemplary in-stream hydro turbine generator farm 600 comprises an array 602 of in-stream turbine generators (e.g. in-stream turbine generators 601 and 603) submersible within a unidirectional fluid flow 604 environment, such as a river and/or unidirectional ocean current 604 operating environment, for example, for extracting therefrom electrical energy in the form of variable voltage, variable frequency signals; a plurality of power conversion modules (e.g. power conversion modules 609 and 618) for converting the variable voltage, variable frequency signals generated by the in-stream turbine generators 601 and 603 into fixed voltage and fixed frequency signals; and a plurality of power transmission cables (e.g. power transmission cables 608 and 619) connecting each of the in-stream turbine generators 601 and 603 to a different one of the power conversion modules 618 and 609, for delivering the variable voltage, variable frequency signals generated by the former to the latter. Power conversion modules 618 and 609 in turn supply the fixed voltage and fixed frequency signals to an electrical power distribution system, such as electrical grid 612.

In-stream turbine generators 601 and 603 may comprise any suitable submersible turbine generator which is suited for submersion and electrical energy generation in a unidirectional fluid flow environment and is operable to extract therefrom electrical energy in the form of variable voltage and variable frequency signals. In one embodiment, as is particularly shown in FIG. 50, in-stream turbine generators 601 and 603 may each have the particular construction of the hydro turbine generator 300 as shown in FIG. 46 and described in further detail above. In such an embodiment, the variable voltage and variable frequency signals generated by rotation of the turbine rotor and associated rotor permanent magnets 607 of in-stream turbine generators 601 and 603 by fluid flow 604 are output through their respective stator generator windings 605 and 614, the details of which are described in connection with FIG. 46. Further in such an embodiment, to deliver the variable voltage and variable frequency signals generated by in-stream turbine generators 601 and 603 to corresponding power conversion modules 618 and 609, power transmission cables 608 and 619 each terminates at one end thereof with electrical splices 615 and 606 respectively, for connecting in-stream turbine generators 601 and 603 at their respective stator generator windings 605 and 614 to power conversion modules 618 and 609 at their respective turbine connection sides 610 and 616.

Through intermediate power conversion modules 618 and 609, power transmission cables 608 and 619 function to transfer the electrical power (i.e. the variable voltage and variable frequency signals) generated by individual in-stream turbine generators 601 and 603, which are submersible within a flowing body of fluid 604, to an electrical distribution system such as electrical grid 612, which is located in a dry area onshore, and typically at a distance from the flowing body of fluid 604. As such, when deployed for use in the in-stream hydro-kinetic turbine generator farm 600, power transmission cables 608 and 619 are partially submersed in the unidirectional fluid flow environment and partially rise above the same. Suitable materials for forming power transmission cables 608 and 619 may be selected from known submersible cable materials familiar to persons skilled in the art.

Power conversion modules 618 and 609 comprise electrical elements, such as switching devices, transformers and power electronics and/or controllers, that are necessary to convert the variable voltage and variable frequency signals received from in-stream turbine generators 601 and 603 at their turbine sides 610 and 616 into fixed voltage and fixed frequency electrical signals at their grid sides 611 and 617 for output to electrical grid 612.

The term "array" used in describing array 602 of in-stream turbine generators 601 and 603 does not connote any specific order by which in-stream turbine generators 601 and 603 are disposed relative to each other. For example, in case the unidirectional fluid flow environment 604 is a river, in-stream turbine generators 601 and 603 may be spatially disposed widthwise across the river extending from one bank 613 towards the other bank; alternatively, in-stream turbine 601 may be disposed upstream or downstream relative to in-stream turbine 603 of array 602.

An exemplary application of the in-stream hydro-kinetic turbine generator farm 600 may include the advantageous adaptation for near shore power generation. That is, in a case where in-stream turbine generators 601 and 603 are located near an edge (e.g. shoreline 613) between the unidirectional fluid flow environment 604 (e.g. ocean) and a dry domain (e.g. land, platform) and are submersed in the former, each in-stream turbine generator 601 and 603 may be paired with its own individual power transmission cables 608 and 619 as discussed above. Each in-stream turbine generator and power transmission cable pair may be viewed as a modular unit that may be plugged into or removed from corresponding power conversion modules 618 and 609, allowing the size of array 602 to be easily modified such as but not limited to as few as two turbine generators, to as many turbine generators as may be suitable or required for a given fluid flow resource. This ease of "plug and power" installation of multiple hydro turbine generators makes the arrangement of in-stream hydro turbine generator farm 600 particularly suitable for off-grid and remote power generation and distribution applications.

Figure 51:
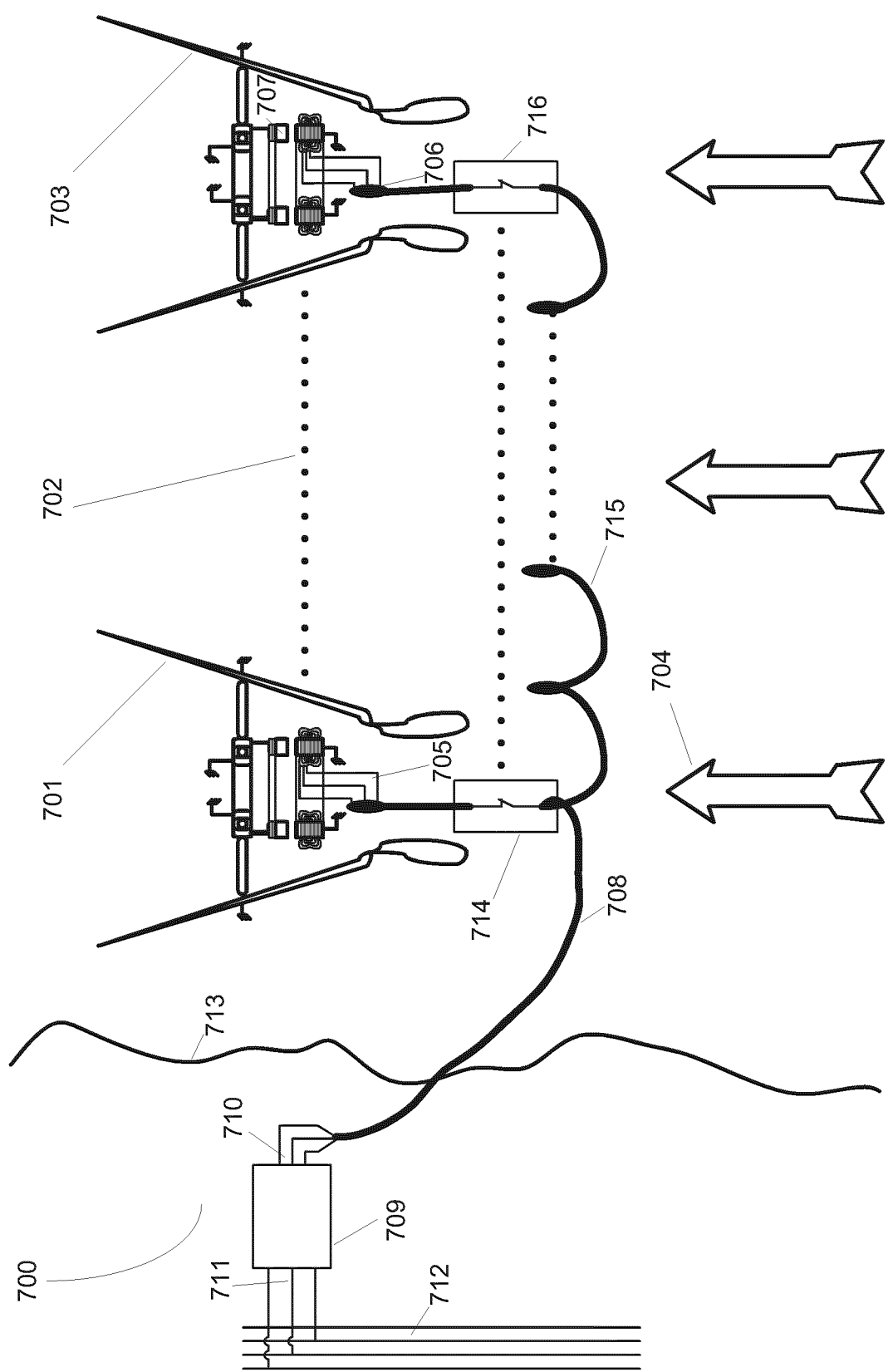
FIG. 51 is a schematic view of an in-stream AC-paralleled turbine generator farm 700 according to an embodiment of the invention

In FIG. 51, a schematic representation of an exemplary in-stream AC-paralleled hydro turbine generator farm 700 according to another embodiment of the invention is shown. Exemplary in-stream hydro turbine generator farm 700 comprises an array 702 of in-stream turbine generators (e.g. in-stream turbine generators 701 and 703, and optionally any further desired or suitable number of additional turbine generators) submersible within a unidirectional fluid flow environment 704, such as a river and/or unidirectional ocean current operating environment, for example, for extracting therefrom electrical energy in the form of variable voltage and variable frequency signals; a bi-directional power conversion module 709 connected to an electrical distribution system such as electrical grid 712; and at least one power transmission cable (e.g. power transmission cable 708) connecting each of the in-stream turbine generators 701 and 703 in parallel to bi-directional power conversion module 709, for delivering the variable voltage and variable frequency electrical signals generated by the turbine generators 701, 703, to the power conversion module 709.

In use, to initially set in-stream turbine generators 701 and 703 into rotational motion in a unidirectional fluid flow environment 704, bi-directional power conversion module 709 is used to convert the fixed voltage and fixed frequency power supplied from electrical grid 712 into a variable voltage and variable frequency power signal, which initially drives in-stream turbine generators 701 and 703 to impart a starting rotation of the permanent magnet rotor 707 of the turbine generators accordingly. Once in-stream turbine generators 701 and 703 are set into rotational motion, the in-stream turbine generators 701 and 703, by virtue of their submersion in substantially the same flow of fluid 704, operate naturally at substantially the same rotational speeds. In one embodiment, if one or more singular turbine generators of the AC-paralleled generator array 702 accelerate or decelerate relative to the common rotational speed of the remaining turbine generators in the array, the singular turbine(s) may advantageously naturally self-synchronize with the remaining turbines to re-establish synchronized parallel AC generation operation. Such natural self-synchronization may desirably occur due to the relatively weak characteristic torque vs. RPM relationship of imparted force of the fluid flow 704 to the turbine generator array 802, relative to the substantially stiff characteristic torque vs. RPM relationship of other power generation prime movers and generators which may commonly require generator governors to maintain synchronization between generators. Further, the configuration of exemplary turbine generator 703 used in the AC-paralleled turbine farm 700 of the present embodiment, which includes permanent magnet turbine rotor 707 comprising permanent magnets and associated back iron (which may desirably function as a rotor cage) desirably results in a direct-on-line machine operating characteristic of the turbine generator array 702, providing for natural self-synchronization without the need for governors or other synchronization power electronics when turbine array 702 is operated in a unidirectional fluid flow environment with individual generator units 701, 703 exposed to a substantially consistent fluid flow 704.

In one embodiment, exemplary in-stream AC-paralleled turbine generator farm 700 may additionally include a plurality of circuit interruption devices, such as circuit breakers (e.g. circuit breakers 714 and 716) disposed in series connection with each of the in-stream turbine generators 701 and 703, between the turbine generator and the power transmission cable 708. If, during operation, any one singular in-stream turbine generator 701 or 703 in array 702 becomes electrically unbalanced or faulty, it may be automatically disconnected by its serially connected circuit breaker 714 or 716 which may desirably sense the flux of power and/or the level of current unbalance in the unbalanced or faulty generator. Such disconnection from the array 702 of a faulty generator may advantageously protect the remaining generator(s) and other electrical system components from damage or other potential negative operational effects.

The arrangement of in-stream AC-paralleled turbine generator farm 700 may be particularly advantageous in applications where the location of the farm 700 is far enough from shore 713 that use of a single power transmission cable 708 makes economical sense, such as in the case of deployment of generator array 702 in an offshore ocean current environment. In such cases, the arrangement of farm 700 may desirably provide a desired generator farm arrangement for a large or utility scale turbine generator farm. The arrangment of farm 700 provides an advantage of requiring the minimum number of the electrical elements and may therefore be suitable for deployment within an electrically conductive and chemically aggressive environment such as for a long-term submerged ocean generator farm, for example.

As compared to direct current (DC) paralleling of turbines as may be used in certain conventional generator farm designs, the arrangement of in-stream AC-paralleled turbine generator farm 700 according to an embodiment of the invention does not require the use of certain submerged direct current power electronics, such as submerged diode-bridges for example, which may be susceptible to fault or degradation over a lengthy submerged duty, thereby advantageously reducing overall cost related to generator farm operation and maintenance.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention. Accordingly, the scope of the invention is to be construed in accordance with the substance defined by the following claims.

What is claimed is:

1. A hydro turbine generator apparatus for generating electrical power from water flow, said apparatus comprising:
   a rotor comprising a hub and a plurality of blades extending radially outward from said hub; and
   a duct comprising an inlet end and an outlet end, an inner surface and an outer surface, and a central longitudinal axis, wherein said hub is disposed along said central longitudinal axis of said duct;
   wherein α comprises a first angle between said central longitudinal axis of said duct and a line tangential to said inner surface of said duct at said outlet end of said duct;
   β comprises a second angle between said central longitudinal axis of said duct and a line between a first point at the beginning of a flared section of said duct and a second point directly downstream of said first point and located on said inner surface of said duct at said outlet end of said duct; and
   wherein the ratio of α/β is between 1.5 and 2.5.

2. The hydro turbine generator apparatus according to claim 1, wherein said inlet end of said duct is substantially circular in elevation, and said outlet end of said duct is oblong in elevation.

3. The hydro turbine generator apparatus according to claim 1, wherein a vertical dimension of said duct is less than a horizontal dimension of said duct.

4. The hydro turbine generator apparatus according to claim 1, wherein a ratio of a cross-sectional area of said outlet end to a cross-sectional area of said inlet end is between 1.1 and 2.1.

5. The hydro turbine generator apparatus according to claim 1, wherein at least one of said inlet and said outlet end of said duct are substantially circular, oblong, obround, elliptical or any combination thereof in elevation.

6. The hydro turbine apparatus according to claim 1, wherein a ratio of a cross-sectional area of said outlet end to a cross-sectional area of said inlet end is between 1.2 and 1.6.

7. The hydro turbine apparatus according to claim 1, wherein said hub comprises a longitudinal hole defined by at least one interior wall surface extending longitudinally through said hub.

8. The hydro turbine apparatus according to claim 1, further comprising at least one intake hood on a lateral surface of said duct, said at least one intake hood further defining at least one intake vent extending between an outer surface and an inner surface of said duct, such that a water flow is redirected from said outer surface of said duct to said inner surface.

9. The hydro turbine apparatus according to claim 1, further comprising a deviation of an edge surface at said outlet end of said duct toward said inlet end of said duct, such that at least one cut-out is defined in said edge surface at said outlet end of said duct.

10. The hydro turbine apparatus according to claim 9, comprising a first said cut-out at a top side of said edge surface at said outlet end of said duct, and a second said cut-out at a bottom side of said edge surface at said outlet end of said duct.

11. The hydro turbine apparatus according to claim 1, wherein said duct has a front face at said inlet end which is oblique in side elevation, inclining inwards towards said hub from a protruding lower front edge of said face to a recessed upper front edge of said face.

12. The hydro turbine generator apparatus according to claim 1, wherein said blades comprise at least one raked section along their span.

13. The hydro turbine generator apparatus according to any claim 1, wherein said blades comprise at least two beaded surface features along at least a portion of a low-pressure side of said blades.

14. The hydro turbine generator apparatus according to claim 1, wherein said blades each comprise a root proximal to said hub and a tip distal from said hub, and wherein said blades taper from said root towards said tip in at least one of chord thickness and chord length dimensions.

15. The hydro turbine generator apparatus according to claim 1, wherein said blades each comprise a root proximal to said hub and a tip distal from said hub, and wherein said blades comprise a radial twist extending along at least a portion of said blade between said root and said tip.

16. The hydro turbine generator apparatus according to claim 14, wherein said taper is biased towards at least one of a leading edge and a trailing edge of said hydro turbine blades.

17. The hydro turbine generator apparatus according to claims 1, additionally comprising a single-sided axial-flux magnetic generator, wherein said magnetic generator provides an axial bearing function comprising an axial magnetic attractive force which is adapted to balance at least a portion of an axial bearing load of said hydro turbine generator.

18. The hydro turbine generator according to claim 17, wherein a gap between a rotor and a stator of said magnetic generator is dynamically adjustable and is operable to dynamically adjust said axial magnetic attractive force.

19. The hydro turbine generator according to claim 1, wherein said generator is additionally operable as a turbine pump.

20. The hydro turbine generator according to claim 1, additionally comprising a permanent magnet generator, wherein a gap between a rotor and a stator of said permanent magnet generator is adapted to be fully flooded by water during immersed operation of said hydro turbine generator.

21. The hydro turbine generator according to claim 1, additionally comprising at least one anti-friction bearing, wherein said at least one anti-friction bearing is adapted to be fully flooded by water during immersed operation of said hydro turbine generator.

22. The hydro turbine generator according to claim 1, additionally comprising a single-sided axial-flux magnetic generator having a permanent magnet rotor, wherein said electrical power comprises variable voltage and frequency power signals, and wherein said generator is additionally operable to be connected to at least one other such generator and to at least one power conversion module in parallel connection for conversion of said variable voltage and frequency power signals to fixed voltage and frequency power signals.

\* \* \* \* \*